US008237814B2

(12) United States Patent
Nagao et al.

(10) Patent No.: US 8,237,814 B2

(45) Date of Patent: Aug. 7, 2012

(54) IMAGING APPARATUS AND STORED PICTURE IMAGE PLAYBACK METHOD

(75) Inventors: Seiji Nagao, Ebina (JP); Kohsuke Arai, Machida (JP); Tomoyuki Nozawa, Fujisawa (JP); Taijiroh Morihisa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 442 days.

(21) Appl. No.: 12/496,175

(22) Filed: Jul. 1, 2009

(65) Prior Publication Data

US 2010/0002095 A1 Jan. 7, 2010

(30) Foreign Application Priority Data

Jul. 3, 2008 (JP) ................................ 2008-174393
Sep. 12, 2008 (JP) ................................ 2008-235188
Jan. 6, 2009 (JP) ................................ 2009-000579

(51) Int. Cl.
*H04N 5/76* (2006.01)
*H04N 5/222* (2006.01)

(52) U.S. Cl. ............... 348/231.2; 348/231.3; 348/231.5; 348/231.6; 348/231.99; 348/333.01; 348/333.05

(58) Field of Classification Search ............. 348/321.99, 348/321.1, 321.2, 321.3, 321.4, 321.5, 321.6, 348/333.01, 333.02, 333.03, 333.04, 333.05, 348/333.06, 333.11, 333.12
See application file for complete search history.

(56) References Cited

U.S. PATENT DOCUMENTS 7,714,925 B2 * 5/2010 Kim ......................... 348/333.05
2003/0174219 A1 * 9/2003 Iijima ...................... 348/231.99
2003/0174220 A1 * 9/2003 Ito ............................. 348/240.2
2004/0201752 A1 * 10/2004 Parulski et al. .......... 348/231.99
2005/0110878 A1 * 5/2005 Dalton ....................... 348/231.2
2006/0192879 A1 * 8/2006 Hisamatsu .............. 348/333.01
2008/0018773 A1 1/2008 Nozawa

FOREIGN PATENT DOCUMENTS

JP 3237900 10/2001
JP 3489454 11/2003
JP 2004-336536 11/2004
JP 2005-234839 9/2005
JP 2006-20065 1/2006
JP 3978530 7/2007
JP 2008-85490 4/2008
JP 2008-109629 5/2008
JP 2008-160374 7/2008

* cited by examiner

*Primary Examiner* — Chieh M Fan
*Assistant Examiner* — Peter Chon
(74) *Attorney, Agent, or Firm* — Dickstein Shapiro LLP

(57) ABSTRACT

An imaging apparatus, which is capable of starting up in a shooting mode and in a playback mode, and capable of switching between the shooting mode and the playback mode, includes: a memory which stores an image file corresponding to a shot picture image; a display which displays the picture image, and a selector which selects at least one image file from a plurality of image files stored in the memory, wherein in a case of starting up in the playback mode, when there is an image file selected by the selector, the selected image file is displayed on the display, and when there is no selected image file, a latest image file which is lastly shot and stored in the memory is displayed on the display.

20 Claims, 40 Drawing Sheets

FIG. 11A
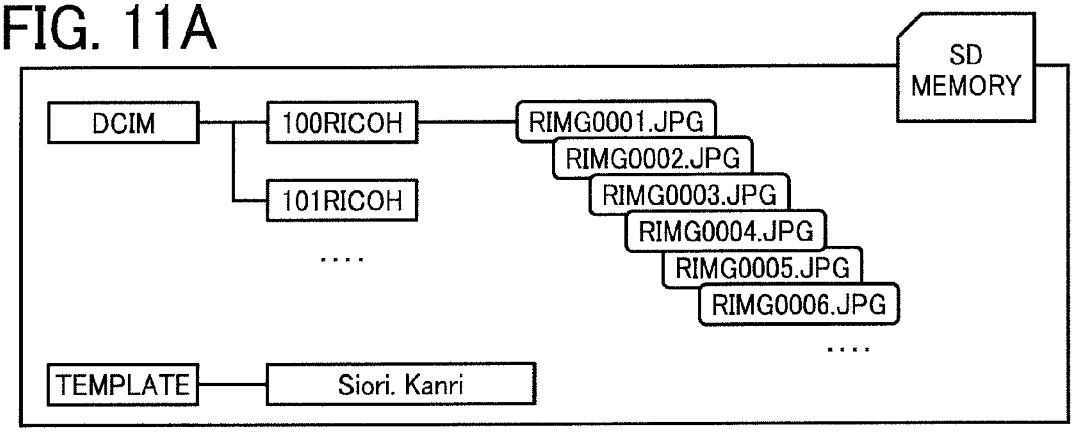
FIG. 11B
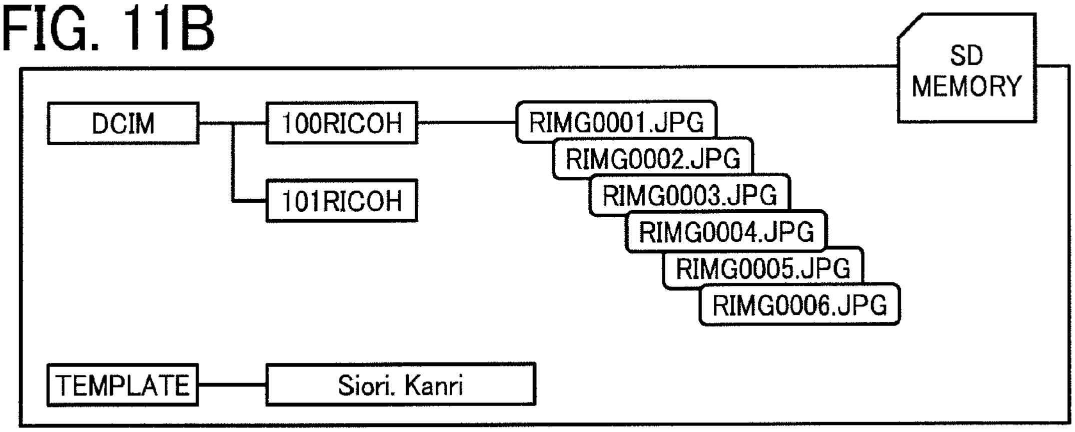
FIG. 11C
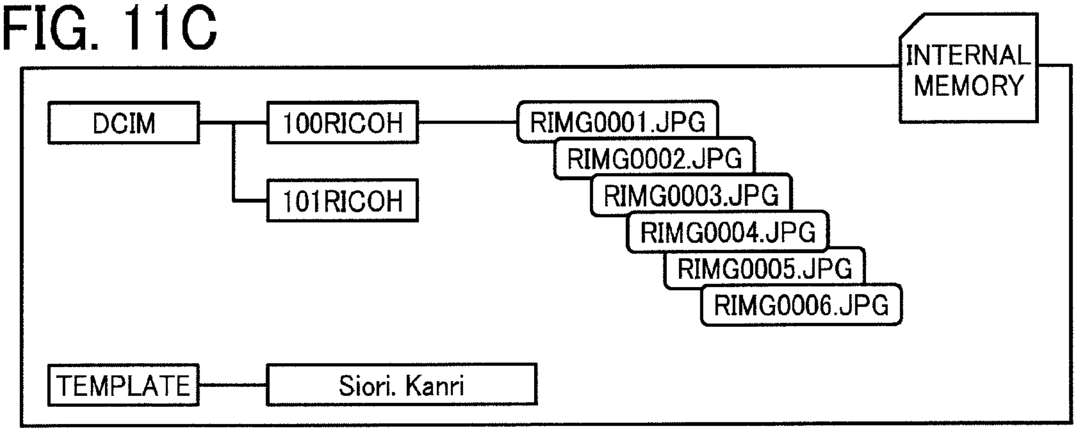
FIG. 11D
Siori. Kanri FILE
IN CASE OF ATTACHING BOOKMARK
INFORMATION TO 100RICOH/RIMG0006. JPG
100RICOH/RIMG0006.JPG

| INDEX NUMBER | AREA INFORMATION 1 | AREA INFORMATION 2 | LATITUDE | LONGITUDE |
|---|---|---|---|---|
| 1 | OKINAWA | ISHIGAKI | 24° 20′N | 124° 69′E |
| 2 | OKINAWA | NAHA | 26° 13′N | 127° 41′E |
| 3 | KAGOSHIMA | KAGOSHIMA | 31° 36′N | 130° 33′E |
| 4 | MIYAZAKI | MIYAZAKI | 31° 54′N | 131° 25′E |
| ... | ... | ... | ... | ... |

IMAGING APPARATUS AND STORED PICTURE IMAGE PLAYBACK METHOD

CROSS-REFERENCE TO RELATED APPLICATIONS

The present application is based on and claims priority from Japanese patent application numbers 2008-174393, filed Jul. 3, 2008, 2008-235188, filed Sep. 12, 2008, and 2009-000579, filed Jan. 6, 2009, the disclosures of which are hereby incorporated by reference herein in their entireties.

BACKGROUND

The present invention relates to an imaging apparatus, which is typified as, for example, a digital camera, and a stored picture image playback method. The present invention has a simple structure, and achieves easy searching for a picture image which a user wishes to play back from among many stored picture images and the picture image playback.

In recent years, as an image inputting apparatus, the use of the digital camera has become widespread. Various types of digital cameras from a single-lens reflex digital camera for professional users to a compact digital camera which takes a snapshot have been commercialized. Furthermore, products incorporating digital camera such as mobile phones, photo booths which photograph the face of a user, and the like have also become widespread.

Most digital cameras are capable of loading external memory cards such as a standardized memory card, a "compact flash" memory card, and the like in their camera bodies, and image files of shot picture images are stored in the external memory cards. After shooting, the images are printable based on image data included in image files stored in the memory cards, or loading the image data into a PC (personal computer) and the image data are usable in various ways. The storage capacity of external memory cards has increased, and the memory cards with several GB (gigabytes) to tens of GB are sold. In addition to the external memory cards, a memory is also provided with many digital cameras in their camera bodies.

The greater the storage capacity of external memory cards, the greater the number of images that can be stored in one memory card. Usually, it is possible to select a size of an image file of a shooting image by a digital camera. If a storage capacity of a memory is 1 GB, approximately 10,000 images of a VGA (video graphics array)-size image file (640×480 resolution), or 1,000 images of a 1 M (megabytes)-size image file (1280×960 resolution), or 500 images of an 8 M-size image file are capable of being stored in the memory.

The digital camera has a liquid crystal display element (hereinafter it is called an "LCD"), and shot picture images are played back by the camera and thereby it is possible to check the images. In a general digital camera, when switching to a playback mode, a latest image file, that is, a last shot picture is displayed on the LCD. Using this playback function, the shot and stored pictures are used not only for viewing, but are also used as useful information taken in the pictures by many users. For example, a timetable for vehicle is shot and stored, and is displayed on the LCD when needed, and thereby it is possible for a user to check the time in the timetable. Or, when a user goes to a specific place, previously stored picture images corresponding to respective marks are displayed on the LCD and are used as a guide. Additionally, a picture of a map, an address book, or the like is displayed on the LCD, and thereby it is possible for a user to check a specific place or address. Digital cameras are used in various ways as described above. Thus, the use of a digital camera as an image inputting apparatus has become widespread.

However, according to a general digital camera, when an operation mode is moved to a playback mode, a latest image file, that is, a last shot picture is displayed on the LCD. Therefore, in a case of playing back pictures, if the digital camera is used in the above ways, it is necessary for a user to search for a picture the user desires by moving forward and backward through the pictures. In other words, there is a possibility of repeats when moving forward and backward through the pictures until reaching the picture the user desires. Particularly, it takes so much time and work for a user who frequently uses a function as described above.

In the mode to playback the stored picture image, if the digital camera is set to firstly display a picture image the user desires, it is possible for the user to use the above function promptly without any complicated operations. In addition to the above display function of the camera, if the camera has another function of enlarging the desired image, for example, a time zone of a timetable which the user often uses, at a desired magnification, and displaying the desired image on the LCD, it is possible for a user to quickly search the desired picture image and display it on the LCD. Furthermore, if there is an image which the user often uses and the user often uses a necessary part of an enlarged image in the image, displaying the enlarged image by a simple operation makes it possible to further enhance convenience of the camera.

On the other hand, for example, pictures of a timetable for a vehicle, a map, an address book and so on are often needed and are frequently checked when a user travels in a specific place; however, these functions are less important when the user leaves the specific place. In this case, if necessary, that is, depending on if the user is in a specific place or not, if a judgment as to whether a picture should be displayed preferentially in the playback mode or not is performed and a picture image is able to be displayed according to this judgment, it is possible to further enhance convenience of the digital camera.

Japanese patent registration number 3489454 discloses a camera which takes out from a memory and plays back a stored picture image selected as a picture image which is displayed under a specific movement condition from among a plurality of stored picture images. The above specific movement condition includes a startup movement of the camera, and a picture image which displays at the startup movement of the camera is a so-called startup screen image. However, in a playback mode, for example, even after switching from a shooting mode to the playback mode, and even when the playback mode is set when the camera starts operating, the above startup screen image is switched to a display of a last shot picture image. Therefore, the above startup screen image is different from a picture image preferentially displayed in the present invention, which is later explained in detail.

Japanese patent registration number 3237900 discloses an image display system which preferentially displays an important image which is necessary for a diagnosis on a medical site from a plurality of image data. Japanese patent registration number 3237900 has a memory for image data which stores image data, but does not have a shooting function; therefore, it is just a display where necessary image data for the diagnosis are displayed only.

Japanese patent publication number 2008-85490 discloses an image display technique for a mobile device with a camera which easily judges shooting areas of each shot picture image in a case where the shot picture images are displayed on a display in turns. More specifically, it has a global positioning system (hereinafter, it is called "GPS") unit, a memory, a display, and an area judging section which judges whether a shooting location of a shot picture image (a second shot picture image) is in the same area as a shooting location of a shot picture image obtained by a previous shooting (a first shot picture image) or not, and in a case where it is judged to be not in the same area, an area displaying image which expresses area information including the shooting location is inserted into a position before a displaying order of the shot picture image (the second shot picture image) and shot picture images are displayed on the display in turns and the area displaying image is displayed in the position where inserted. In other words, the area information of the shooting location is displayed in the shot picture image.

SUMMARY

An object of the present invention is to provide an imaging apparatus having enhanced practicality which promptly selects a user's desired picture image from among many image files stored in a memory and displays the user's desired picture image on a display, and is used not only for viewing shot picture images, and a playback method of stored picture images.

To achieve the above object, an embodiment of the present invention provides: an imaging apparatus, which is capable of starting up in a shooting mode and in a playback mode, and capable of switching between the shooting mode and the playback mode, comprising: a memory which stores an image file corresponding to a shot picture image; a display which displays the picture image, and a selector which selects at least one image file from a plurality of image files stored in the memory, wherein in a case of starting up in the playback mode, when there is an image file selected by the selector, the selected image file is displayed on the display, and when there is no selected image file, a latest image file which is lastly shot and stored in the memory is displayed on the display.

Preferably, the imaging apparatus, further comprises: an operating section, wherein after switching from the shooting mode to the playback mode, the latest image file is displayed on the display, and when the operation section is operated and when there is the selected image file, the selected image file is displayed on the display.

Preferably, information to judge which image file stored in the memory is the selected image file is stored in at least one of an external memory, an internal memory of the imaging apparatus, or the image file itself.

Preferably, the information is stored in the external memory as a management file which is different from the image file, and the management file is read when power is turned on.

Preferably, the selector selects a plurality of image files from the plurality of image files stored in the memory, and in a case of starting up in the playback mode, when there are image files selected by the selector, one of the selected image files is displayed on the display, and when there are no selected image files, the latest image file is displayed on the display.

Preferably, when the selected image file is displayed on the display and enlarged by a user's instruction, a magnification and center coordinates of the displayed enlarged image are stored in a memory, and in a case where the stored image file is displayed on the display again, the image file is displayed in a state being enlarged with the stored magnification and the center coordinates.

Preferably, in a case of starting up in the playback mode, when there are the selected image files, an image file with the highest priority among the selected image files is firstly displayed on the display, and then each time a predetermined operation is performed on an operating section, the image file among the selected image files is displayed on the display according to priority.

Preferably, after switching from the shooting mode to the playback mode, the latest image file is displayed on the display, and in a case where a predetermined operation is performed on an operating section, when there are the selected image files, the image file with the highest priority among the selected image files is firstly displayed on the display, and then each time the predetermined operation is performed on the operating section, the image file among the selected image files is displayed one by one according to priority.

Preferably, the priority is based on a selected order of the image files being selected by the selector.

Preferably, the priority is based on information of time and date when the selected image files are shot and generated.

To achieve the above object, an embodiment of the present invention provides: a stored picture image playback method, comprising: a step of preparing an imaging apparatus, which is capable of starting up in a shooting mode and in a playback mode, and capable of switching the shooting mode and the playback mode, having: a memory which stores an image file corresponding to a shot picture image; a display which displays the picture image, and a selector which selects at least one image file from a plurality of image files stored in the memory, and a step of displaying a selected image file on the display when there is the image file selected by the selector and displaying a latest image file which is lastly shot and stored in the memory on the display when there is no selected image file in a case of starting up in the playback mode.

Preferably, the stored picture image playback method, further comprises: a step of preparing an operating section, and a step of displaying the latest image file on the display after switching from the shooting mode to the playback mode and displaying the selected image file on the display when there is the selected image file.

Preferably, information to judge which image file stored in the memory is the selected image file is stored in at least one of an external memory, an internal memory of the imaging apparatus, or the image file itself.

Preferably, the information is stored in the external memory as a management file which is different from the image file, and the management file is read when power is turned on.

Preferably, the selector selects a plurality of image files from the plurality of image files stored in the memory, and in a case of starting up in the playback mode, when there are image files selected by the selector, one of the selected image files is displayed on the display, and when there are no selected image files, the latest image file is displayed on the display.

Preferably, when the selected image file is displayed on the display and enlarged by a user's instruction, a magnification and center coordinates of the displayed enlarged image are stored in a memory, and in a case where the stored image file is displayed on the display again, the image file is displayed in a state being enlarged with the stored magnification and the center coordinates.

Preferably, in a case of starting up in the playback mode, when there are the selected image files, an image file with the highest priority among the selected image files is firstly displayed on the display, and then each time a predetermined operation is performed on an operating section, the image file among the selected image files is displayed on the display according to priority.

Preferably, after switching from the shooting mode to the playback mode, the latest image file is displayed on the display, and in a case where a predetermined operation is performed on an operating section, when there are the selected image files, the image file with the highest priority among the selected image files is firstly displayed on the display, and then each time the predetermined operation is performed on the operating section, the image file among the selected image files is displayed one by one according to priority.

Preferably, the priority is based on a selected order of the image files being selected by the selector.

Preferably, the priority is based on information of time and date when the selected image files are shot and generated.

BRIEF DESCRIPTION OF THE DRAWINGS

FIG. 11A is a diagram of a file specification, namely, an external memory illustrating an example of a directory structure for searching the image file with the bookmark in the above embodiment.

FIG. 11B is a diagram of a file specification, namely, an external memory illustrating an example of a directory structure for searching the image file with the bookmark in the above embodiment.

FIG. 11C is a diagram of a file specification, namely, an internal memory illustrating an example of a directory structure for searching the image file with the bookmark in the above embodiment.

FIG. 11D illustrates a Siori. Kanri file which stores a management file for a bookmark playback in the above embodiment.

DETAILED DESCRIPTION OF THE PREFERRED EMBODIMENTS

Figure 1:
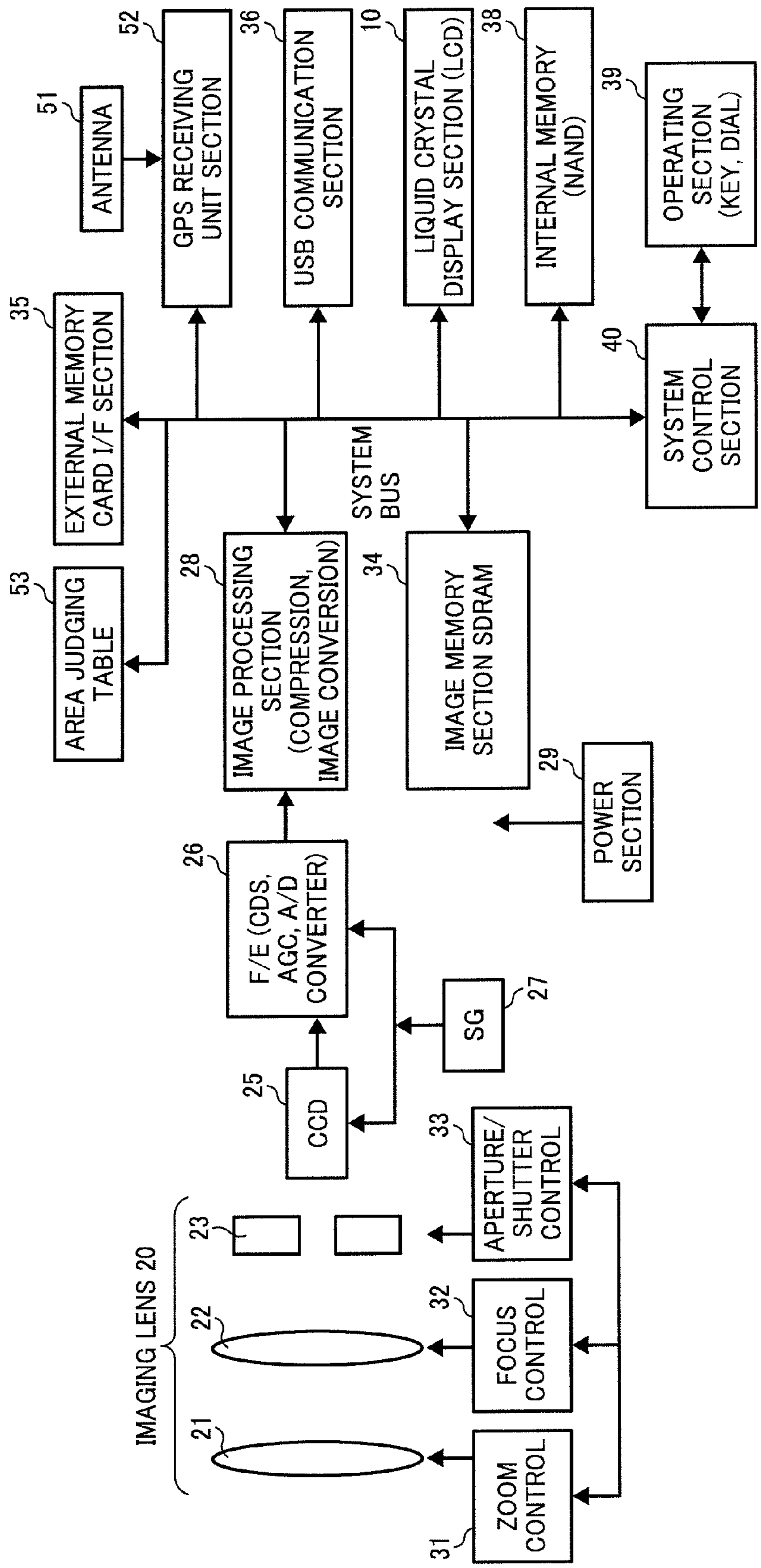
FIG. 1 is a function block diagram illustrating a structure example of a control system and so on applied to an imaging apparatus and a stored picture playback method according to an embodiment of the present invention.

Hereinafter, referring to the drawings, embodiments of an imaging apparatus and a stored picture image playback method according to the present invention will be explained.

Firstly, as an example of the imaging apparatus according to the present invention, referring to FIGS. 2 and 3, which illustrate an example of an exterior view of a digital camera, an operating section and a display which are necessary to carry out the present invention will be explained.

Figure 2:
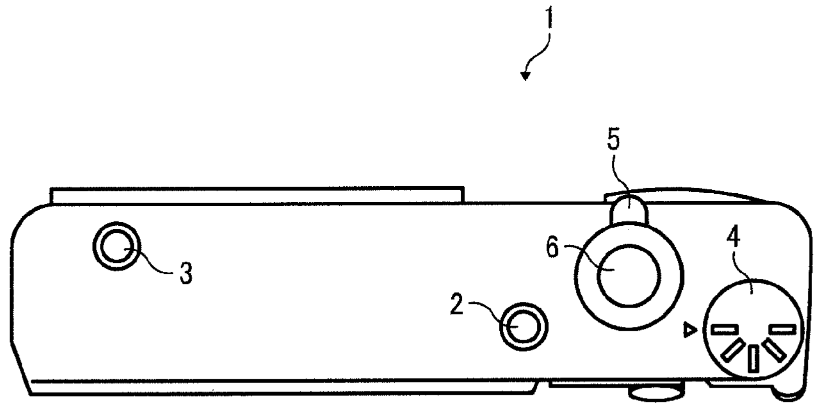
FIG. 2 is a plan view illustrating an example of an exterior view of the imaging apparatus according to the embodiment of the present invention.
Figure 3:
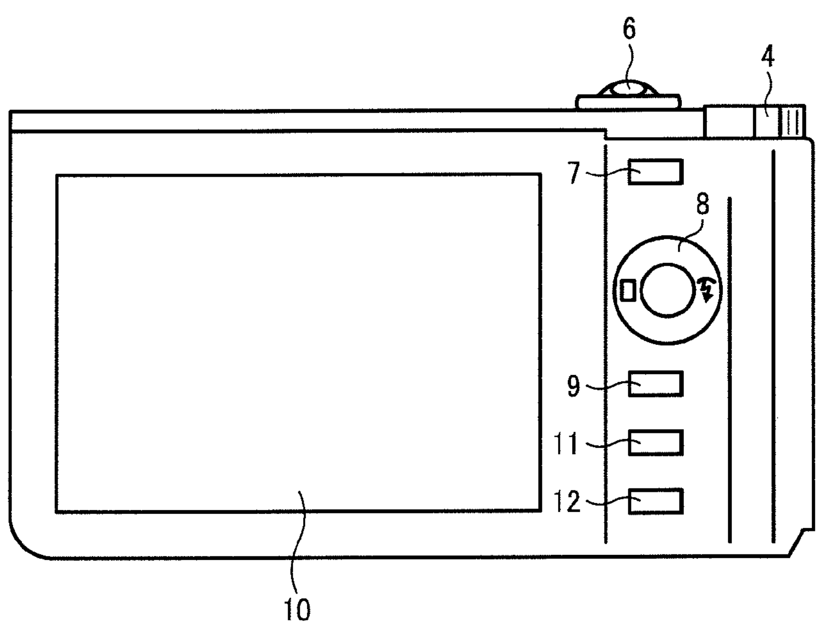
FIG. 3 is a back view illustrating an example of the exterior view of the above imaging apparatus.

A digital camera 1 as an imaging apparatus, as illustrated in FIG. 2, has a power switch button 2, a function button 3, a dial key 4, a zoom lever 5 and a shutter release button 6 on a top surface side of the digital camera 1. As illustrated in FIG. 3, on the right end of its back surface side, a playback button 7, an OK/Cross key 8, a menu key 9, a recycle bin/self-timer key 11, and a DISP (display) key 12 are disposed in turns from the top. The operation section 39 (a selector) comprises the above.

Occupying most of the back side of the digital camera 1, the display 10 (hereinafter, this display is also called "LCD 10") comprising an LCD (liquid crystal display) display element is disposed.

The power switch button 2 switches the power alternately on and off each time the power switch button 2 is pressed.

The function button 3, which will be explained later, for example, is used for selecting a particular image file from among a number of image files and the like.

The dial key 4 is a dial which sets various mode settings for shooting and determines a shooting mode such as a scene mode, a movie mode, an ordinary still image mode and so on.

In the case of shooting, when the zoom lever 5 is turned to the right in FIG. 2, for example, a picture image of a photographic subject is zoomed-in in a telephoto (TELE) side, and when the zoom lever 5 is turned to the left in FIG. 2, for example, a picture image of a photographic subject is zoomed-out in a wide-angle (Wide) side.

The zoom lever 5 is also used for switching display types such as a thumbnail (a plurality of picture images) playback, an enlarged playback, when displaying a stored image file on the display, which is explained later.

The playback button 7 is generally used in a case of changing a different movement mode to a playback mode; however in this embodiment, the playback button 7 is not only used in a case of changing to the playback mode, but also in a case of turning the power on in the playback mode. When the power switch button 2 is used for turning the power on, the digital camera 1 is started in the shooting mode. However, when the playback button 7 is used and pressed for a certain period for turning the power on, the digital camera 1 is started in the playback mode.

Under the playback button 7, there is the OK/Cross key 8. The OK/Cross key 8 is used for selecting a menu displayed on the LCD 10 and, for example, selecting a macro shooting mode when shooting, changing a flash setting, or the like. The menu key 9 arranged under the OK/Cross key 8 is used for inserting a menu screen when shooting or playing back. The recycle bin/self-timer key 11 arranged under the menu key 9 is used for changing to a self-timer mode when shooting, and is used for deleting an image file when playing back. The DISP key 12 arranged under the recycle bin/self-timer key 11 changes a display state of the LCD 10. The display state of the LCD 10 displaying an icon on the LCD 10 or canceling the display, and lowering brightness of the LCD 10 makes it possible to be in a power saving mode.

FIG. 1 is a function block diagram illustrating a structure example of a control system and so on of the imaging apparatus according to the embodiment of the present invention. In FIG. 1, an imaging lens section 20 is incorporated on a front surface side of the digital camera 1 illustrated in FIGS. 2 and 3, and comprises a zoom lens 21, a focus lens 22 and a mechanical section 23. The mechanical section 23 is structured of a mechanical shutter, an aperture, a filter and so on. And the mechanical section 23 comprises a zoom controller 31 which drives the zoom lens 21 to achieve a zoom function, a focus controller 32 which drives the focus lens 22 to focus a photographic subject, and an aperture/shutter controller 33 which performs an aperture control and a shutter control according to brightness of a photographic subject by driving the mechanical section 23. Generally, this aperture/shutter controller 33 controls a shutter speed, that is, controls a length of time the shutter is open. The imaging lens section 20 forms an image of a photographic subject onto an imaging surface. A CCD (charge-coupled device) 25 as an image sensor is arranged in the imaging surface, and the image of the photographic subject is converted to an electric signal.

An image signal of the photographic subject converted by the CCD 25 is an analog signal and this analog image signal is transmitted to a front-end section 28 (hereinafter, it is called "F/E"). The F/E 28 comprises a CDS (correlated double sampling) circuit, an AGC (automatic gain control) circuit and an A/D (analog/digital) converter. The CDS circuit performs a correlated double sampling on an analog image signal inputted from the CCD 25. The AGC circuit adjusts a gain of the analog image signal outputted from the CDS circuit. The A/D converter performs an A/D conversion on the analog image signal outputted from the AGC circuit to convert to digital image data and output. A signal generator (hereinafter, it is called "SG") 27 controls the CCD 25 and the F/E 26 based on a control signal outputted from a system controller 40 comprising a CPU (central processing unit). A power supply section 29 supplies power to each block. In general digital cameras, power is supplied from an exclusive battery or a standardized battery such as an AA battery, and an appropriate voltage is supplied to each block by a DC/DC converter. The power supply section 29 of the present embodiment is structured likewise. An image processing section 28 performs various image processes on digital image data inputted from the F/E 26. For example, the image processing section 28 has an image conversion function which converts an image format to convert raw data of digital image inputted from the F/E 26 to a YUV (Y: brightness data, UV: color difference data) format. And the image processing section 28 has a compression/decompression function to compress YUV data, or to decompress compressed data, in a compression format complying with JPEG (joint photographic experts group) format.

A control system illustrated in FIG. 1 comprises a memory section (SDRAM: synchronous dynamic random access memory) 34, the image processing section 28, an external memory card I/F (interface) section 35, a system control section 40 (a selector), a USB (universal serial bus) communication section 36, the LCD 10 and an internal memory 38, which are connected by a system bus. Image data is compressed in the image processing section 28, complying with Exif, an image file format of a digital camera, in which a shooting condition and a model name of a camera are added as a header of JPEG data, and is temporarily stored in the memory section (SDRAM) 34 as a shot JPEG file. In the digital camera 1, a card slot which is for a detachable standardized external memory card such as a compact flash memory, an SD (secure digital) card and the like is provided. The external memory card I/F section 35 exchanges the above JPEG file with a main body of the camera and the external memory card, and stores the JPEG file in an internal memory 38 of the camera and the external memory.

In a case where the external memory is not loaded with the digital camera 1, image files are stored in the internal memory (NAND-type flash memory) 38. In the internal memory (NAND-type flash memory) 38, the image files remain without deleting when the power is turned off. And in the internal memory 38, information of a parameter when shooting setting by a user is stored. A USB communication section 36 is used for exchanging shot image files with an external device such as a PC (personal computer) or the like. The USB communication section 36 is used for loading shot image files stored in the camera to the PC mainly by use of a USB cable.

The LCD 10 displays a live-preview image to confirm a photographic subject before shooting, or displays image files after shooting as a playback image, and displays to select any mode from among the various modes and perform various settings.

In recent years, the use of imaging apparatuses with a large LCD of 2 inches, 3 inches or the like has increased.

The operating section 39, as described above, comprises a plurality of switches so that a user can give various instructions to an imaging apparatus.

Major switches of the operating section 39 include the power switch button 2 to turn the power on, the dial key 4 to switch between various modes such as a shooting mode, a playback mode, a movie mode and the like, and the shutter release button 6 to press the shutter.

From an on-and-off movement of the above various switches, it is possible to judge if a user operates the above various switches or not, and these on-and-off signals are transmitted to the system control section 40. The system control section 40 controls each block part connected by the system bus. Various movements of the imaging apparatus are controlled by the system control section 40. And a control program is stored in the internal memory (NAND-type flash memory) 38.

The embodiment of the imaging apparatus illustrated in FIG. 1 includes a GPS (global positioning system). The GPS has a GPS receiving unit 52, an antenna for the GPS 51, and an area judging table 53 which cooperates with the GPS. The area judging table 53 in which area information corresponding to predetermined position information is recorded as a table beforehand. The GPS receiving unit 52 and the area judging table 53 are connected to the above system bus. A relationship between the GPS and the imaging apparatus will be explained later.

Hereinabove, the structure example of a hardware part of the imaging apparatus according to the embodiment of the present invention has been explained. In the above hardware structure, the present invention stores software, that is, a control program, in the internal memory (NAND-type flash memory) 38, and thereby at least one image file is selected from among a plurality of image files stored in the memory and a bookmark is attached to the image file, and in a predetermined case, the image file with the bookmark is displayed preferentially compared to other image files. In other words, the present invention provides a "bookmark function". This bookmark function itself has various embodiments and a display function of displaying an image file using the bookmark function also has various embodiments. Hereinafter, the various embodiments will be explained. In some embodiments, the "bookmark function" is also called a "clip function".

[Embodiment 1]

Figure 4:
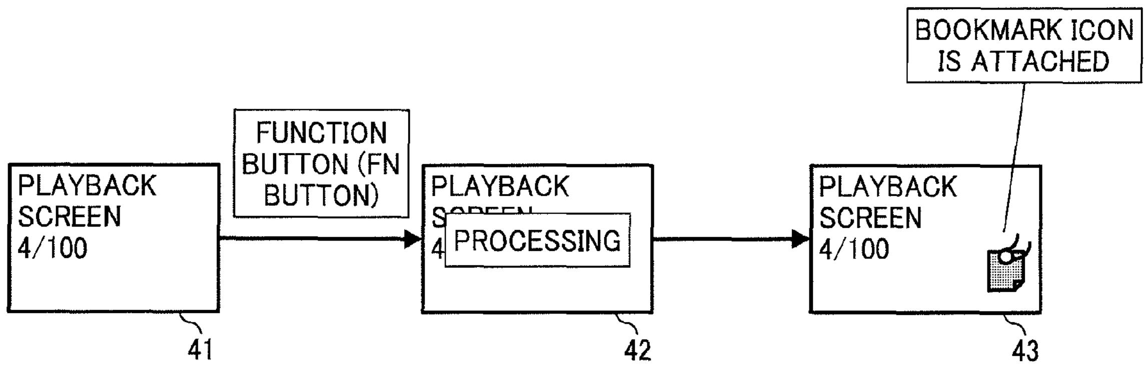
FIG. 4 is a flow chart illustrating an example of a bookmark function according to embodiment 1 of the present invention.
Figure 5:
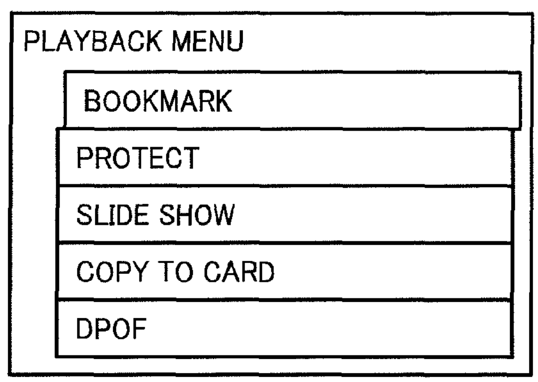
FIG. 5 illustrates an example of a playback menu screen which is used in a case where a bookmark is set to an image file.
Figure 6:
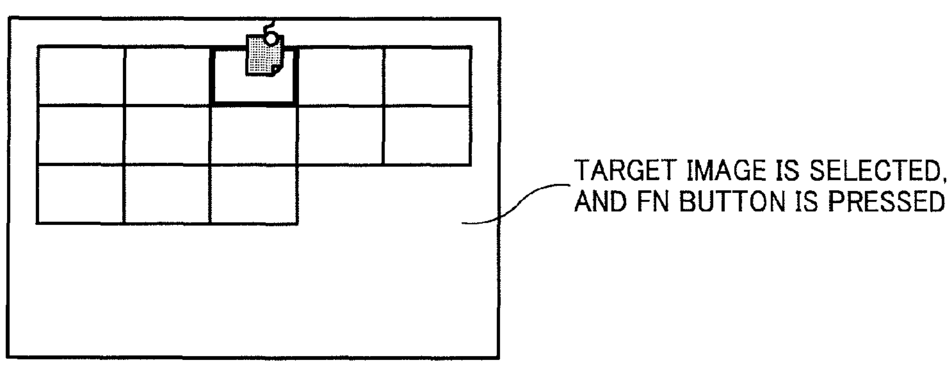
FIG. 6 illustrates another image screen example which is used in the case where the bookmark is set to the image file.

In FIG. 4, an operation flow of an example of the bookmark function is illustrated. In this embodiment, an image file in which a user wishes to attach a bookmark, for example, such as a timetable, an image file where an image which the user wishes to use on a daily basis is stored is selected and displayed on the LCD 10. In an example of FIG. 4, as illustrated in a playback screen image 41, a 4th image file in which 100 image files are stored is selected and displayed. In this state, the function button 3 is pressed, a bookmark information is attached to the 4th image file and a bookmark icon is displayed on the LCD 10. A playback screen image 42 is a screen image of processing, and after processing, as illustrated in a playback screen image 43, an icon which indicates that a bookmark is attached to the 4th image file is displayed. A method of attaching a bookmark, other than the above method, in a state where an image file is displayed, may be a method where a playback menu as illustrated in FIG. 5 is displayed and a "bookmark" of the playback menu is selected. In addition, as illustrated in FIG. 6, the method of attaching a bookmark may be a method where a cursor is placed at a target image among a plurality of images displayed in a thumbnail format and a function button is pressed.

Figure 7:
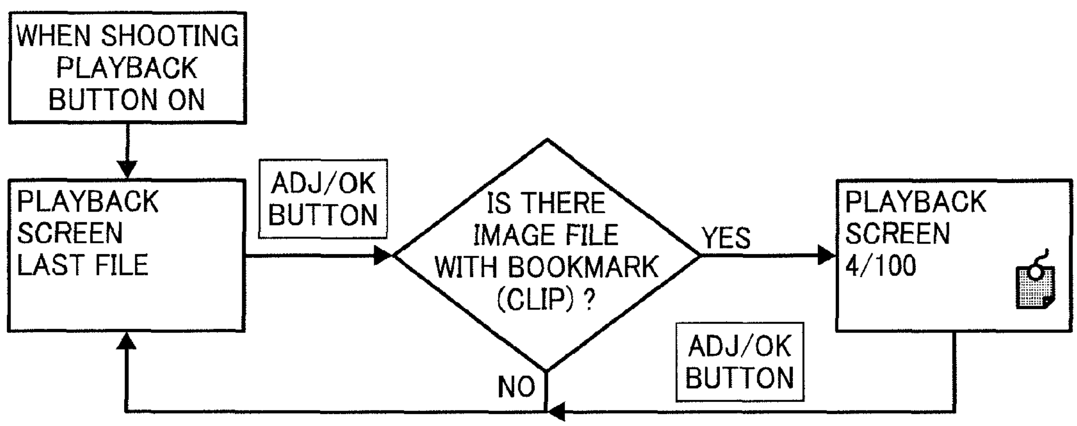
FIG. 7 is a flow chart illustrating an example of a movement of displaying a playback screen in the above embodiment.

FIG. 7, in the above embodiment, is a flow chart illustrating a movement in a case where the playback mode button is pressed when shooting. In a shooting mode, by pressing the playback button, an image file which was lastly shot, that is, a "LAST FILE (last file)", is displayed. In this case, when a predetermined operating section, for example, the OK/Cross key 8 is pressed, it is judged if there is an image file with a bookmark or not. In a case where there is an image file with a bookmark, a picture of the image file with the bookmark is displayed (in the above example, a picture of the 4th image file is displayed). And when the OK/Cross key 8 is pressed again, a picture of the image file which was lastly shot is displayed again, that is, the displayed image file returns to the image file which was lastly shot. In a case where there is no image file with a bookmark, the image file which was lastly shot remains displayed, though the OK/Cross key 8 is pressed.

Figure 8:
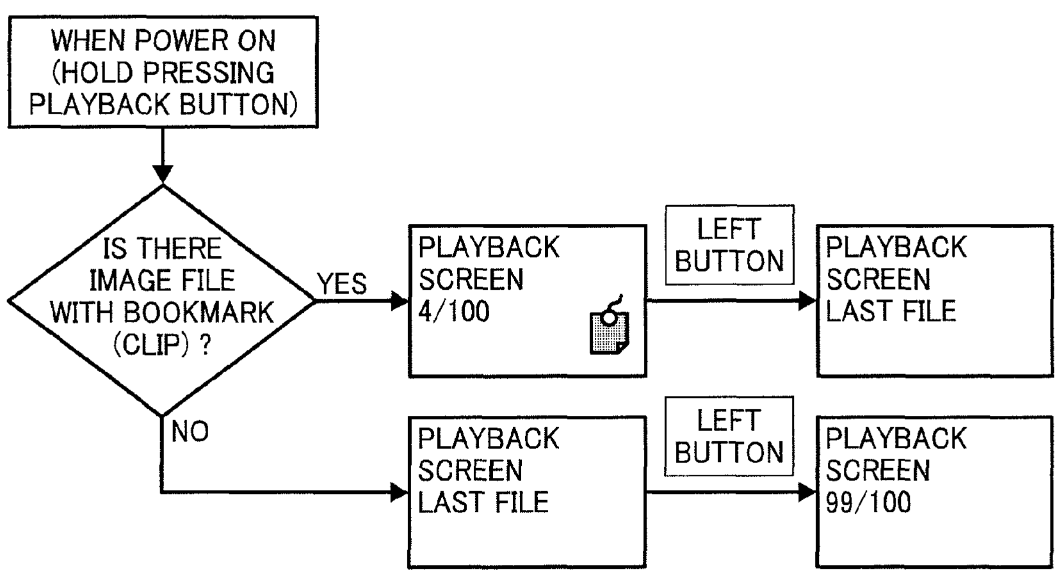
FIG. 8 is a flow chart illustrating another example of the movement of displaying the playback screen in the above embodiment.

FIG. 8 illustrates a movement when the power of a camera is turned on and starts operating by pressing a playback button for a predetermined time. When the power is turned on by this operation, firstly, it is judged if there is an image file with a bookmark or not. In a case where there is the image file with the bookmark, the image file with the bookmark is displayed, that is, in the above case, the 4/100 image file is displayed. In this display state, when a predetermined operating section, for example, a left button of the OK/Cross key 8 is pressed, as described above, a displayed image file is switched to an image file which was lastly shot. In a case where there is no image file with a bookmark, an image file which was lastly shot since the camera started operating as described above is displayed, and in this display state, for example, when the left button of the OK/Cross key 8 is pressed, an image file which was a second last shot is displayed. Subsequently, each time the left button of the OK/Cross key 8 is pressed, an image file which was previously shot is displayed in turns.

Figure 9:
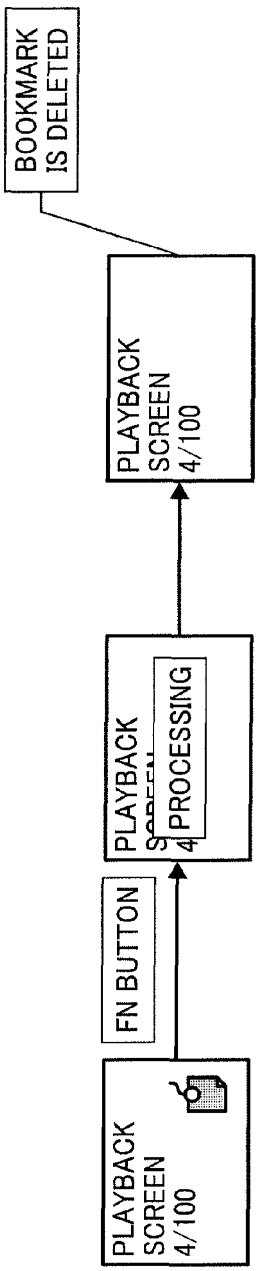
FIG. 9 is a flow chart illustrating an example of deleting the bookmark attached to the image file in the above embodiment.

FIG. 9 illustrates an example of a method of deleting an attached bookmark. In a state where an image file with a bookmark is displayed, when a function button is pressed, the bookmark is deleted from the image file with the bookmark.

Figure 10:
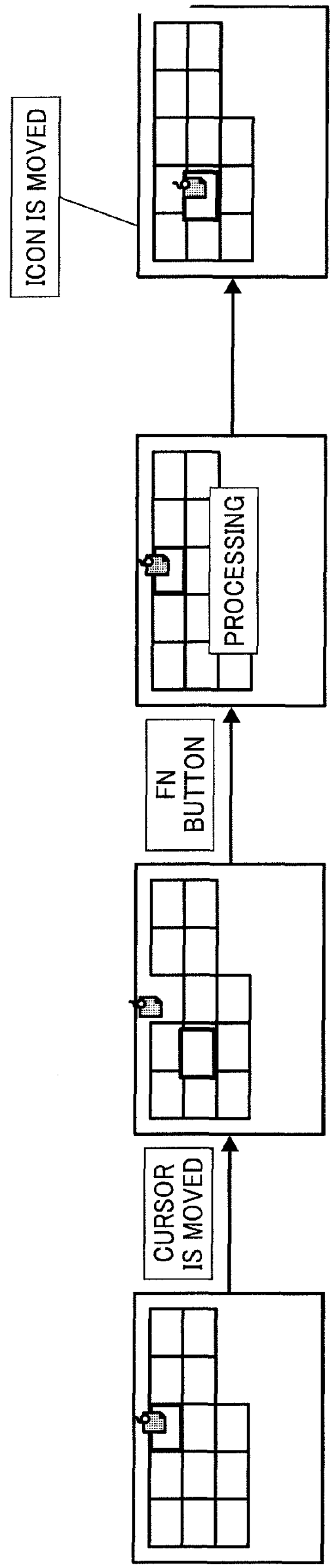
FIG. 10 is a flow chart illustrating an example of changing the bookmark attached to the image file to a different image file in the above embodiment.

FIG. 10 illustrates an example of changing a bookmark of an image file with a bookmark to a different image file. Firstly, a plurality of image files stored in a memory are displayed in a thumbnail format. Among the plurality of the image files an image file with a bookmark is included, and an icon which indicates where the bookmark is attached is displayed on this image file with the bookmark. And then a cursor is moved, an image file to which a bookmark to be attached is selected, and a function button is pressed, the bookmark is deleted from the image file with the bookmark, and a bookmark is attached to the above selected image file. In this embodiment, a bookmark is attached to only one image file among shot image files. Because of taking time to process a change of a bookmark, an indication of "processing" is displayed on the display 10 while processing.

Though a user often has a plurality of external memories such as an SD card and the like, a bookmark is attached to only one image file per external memory. In addition, a camera according to the present embodiment has an internal memory, and a bookmark is also attached to only one image file as for a shot and stored image file in the internal memory.

Next, various examples of file specifications in a case of attaching a bookmark will be explained.

Figure 27:
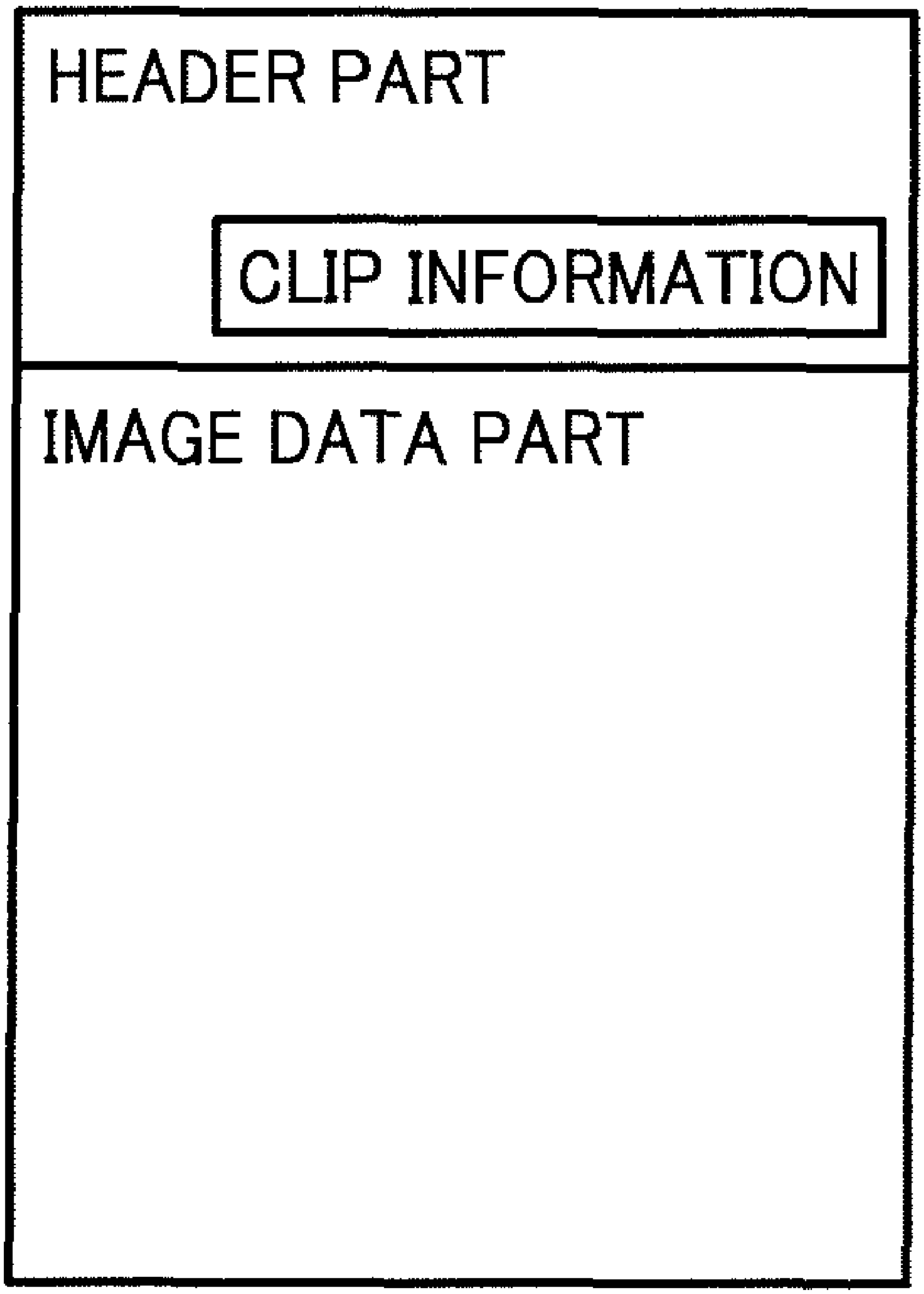
FIG. 27 is a diagram illustrating an example of a management information file of an image file with a clip which is applicable to the above embodiment.

An example of the file specifications, as illustrated in FIG. 27, is a method of putting bookmark information in an image file. A specification for an image file format used by a digital camera is determined by a specification for an image file format used by a digital still camera (it is called "Exif"). In a header of an Exif file, there is a MakerNote tag which is peculiarly settable by a manufacturer, and the bookmark information is put in the file.

However, in a case where there are so many shot and stored image files, for example, more than 1000 image files, when a user searches for a desired image file among them, the user has to open and search all the image files if there is the bookmark information in the MakerNote tag or not. It takes more time for this search process and more start-up time, if there are so many stored image files. In addition, a user turns the power of a digital camera on when the user wishes to shoot, and accordingly a length of the start-up time is a very important factor in the digital camera. Therefore, if it takes more start-up time as described above, the convenience of the digital camera is degraded.

A problem as described above is solved by adopting a file specification illustrated in FIGS. 11A to 11D. Examples of FIGS. 11A to 11D illustrate examples in a case where a user has 2 external memories comprising SD cards. FIGS. 11A and 11B respectively illustrate an external memory, and FIG. 11C illustrates an internal memory. In each external memory, based on a DCF (design rule for camera file system) specification, there are a DCIM (digital camera images) folder under a root directory, and for example, a 100RICOH folder under the DCIM folder, and in the 100RICOH folder, a plurality of image files such as shot image files of RIMG0001JPG, RIMG0002.JPG, RIMG0003.JPG, etc are stored. There is a similar directory structure to the above in the internal memory. In the present example, in each external and internal memory, under the root directory, a template folder is created in which a management file of a bookmark playback called a "Siori.Kanri" file (a bookmark management file) is stored. In the Siori.Kanri file, as illustrated in FIG. 11D, a specific file name, for example, 100RICOH/RIMG0006.JPG, which is selected by a user, is only recorded.

Figure 12:
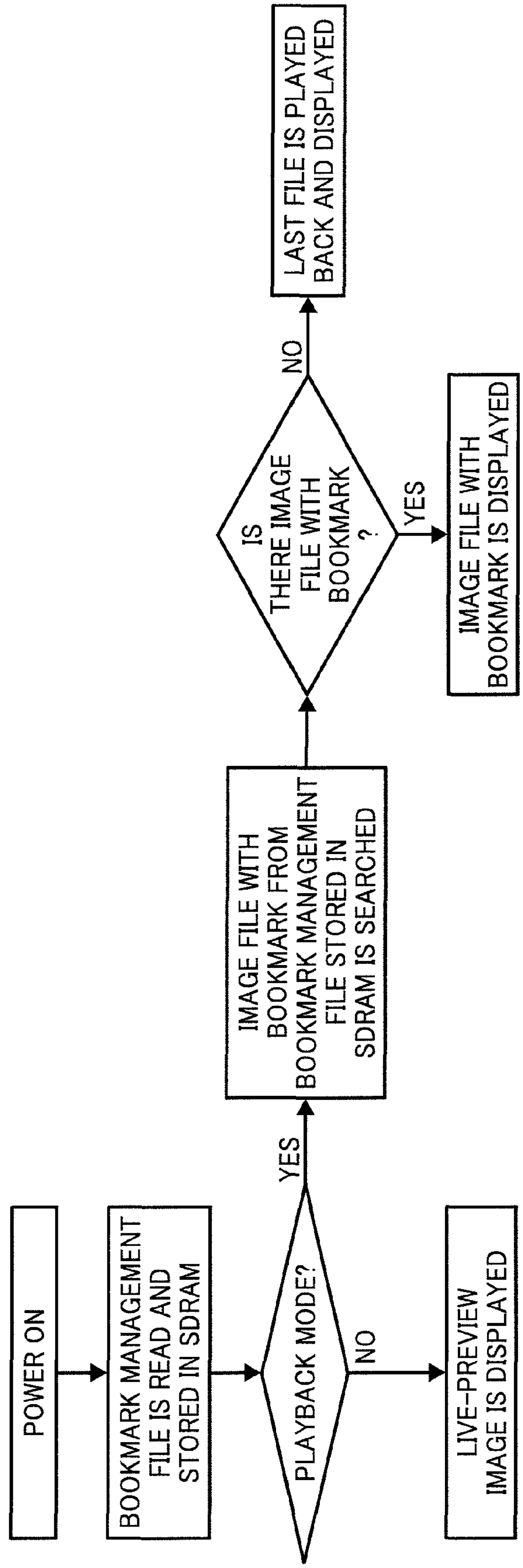
FIG. 12 is a flow chart illustrating a playback movement of an image in the above embodiment.
Figure 13:
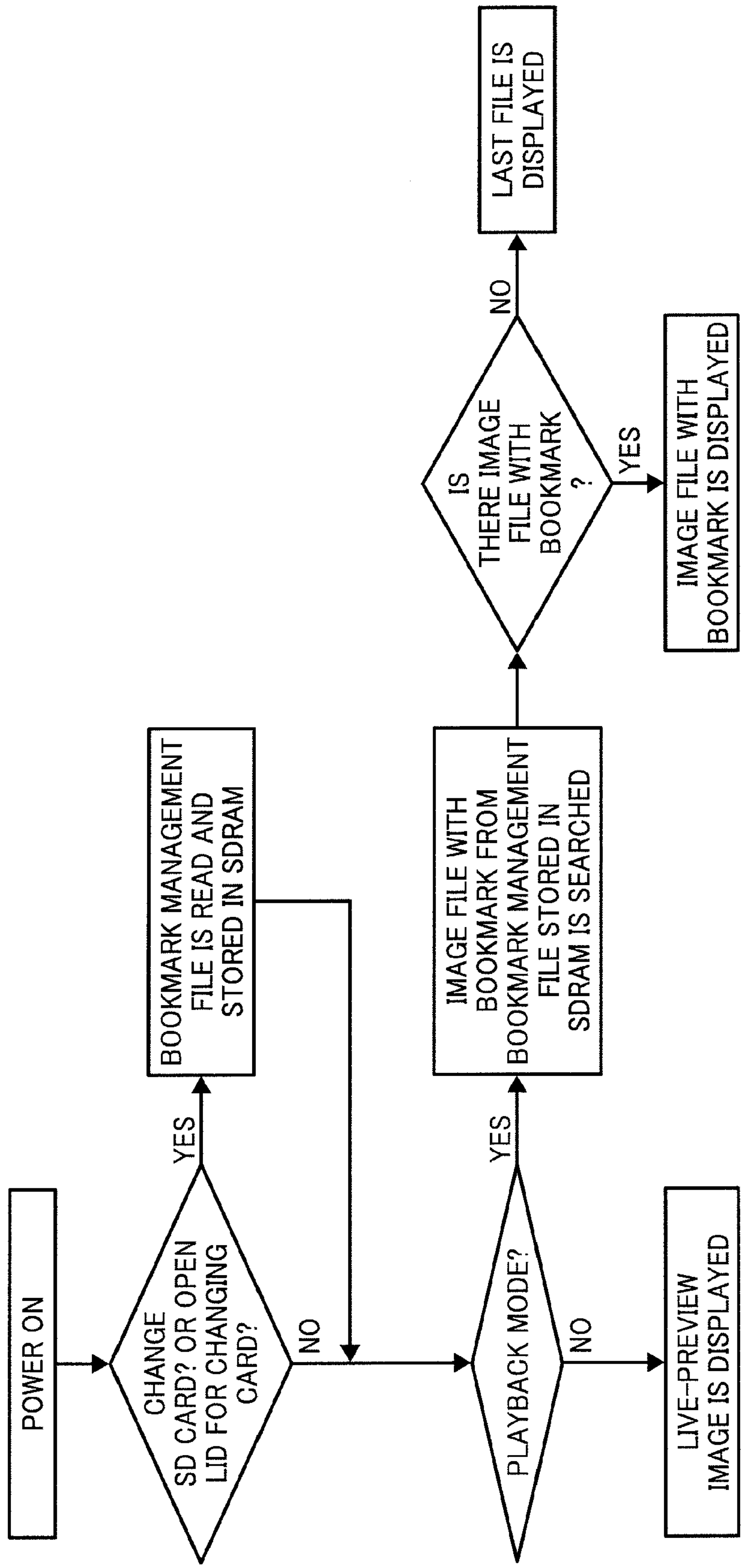
FIG. 13 is a flow chart illustrating another playback movement of an image in the above embodiment.

FIGS. 12 and 13 are flow charts illustrating a playback movement of a picture image, in a digital camera where the management file of the bookmark playback in each memory is as described above. Firstly, a movement illustrated in FIG. 12 will be explained. In a case where the power is turned on in a shooting mode and in a case where the power is turned on in a playback mode, the bookmark management file is firstly read, and an image file with a bookmark is stored in SDRAM. Next, it is judged if it is in the playback mode or not. And when it is judged to be in the playback mode, it is judged if there is an image file with the bookmark in SDRAM or not. And when it is judged that there is the image file with the book mark, the image file with the bookmark is displayed on the display 10. And when it is judged that there is no image file with a bookmark, an image file which was lastly shot (LAST FILE) is displayed on the display 10. In a case where the power is not turned on in the playback mode, a live-preview image is displayed on the display 10.

A flow chart in FIG. 13 illustrates a movement of a change of an external memory or the like. When the power is turned on as described above, firstly, it is judged if the external memory is changed or not, or if a lid of an external memory storage section is opened or not. In a case where the external memory is changed, or the lid of the external memory storage section is opened, the bookmark management file is read, and the image file with the bookmark is stored in SDRAM, and then a movement in similar order to the movement illustrated in FIG. 12 is performed. In a case where the external memory is not changed, and the lid of the external memory storage section is not opened, either, going to a step in which it is judged if the digital camera is set in the playback mode or not, and subsequently, a movement in a similar order to the movement illustrated in FIG. 12 is performed.

Thus, attaching a bookmark to an image file which is optionally selected by a user makes it possible to preferentially display the image file on the playback screen, and thereby it is possible to omit a need of opening many image files to select and display a desired image file. In addition, there is the bookmark management file which is different from the image file, therefore it is possible to promptly search the image file with the bookmark without searching all the image files and to display a target image file quickly.

[Embodiment 2]

In embodiment 1, a bookmark is attached to only one image file; however, there may be a plurality of image files with bookmarks. In addition, priority orders may be set to the plurality of image files with bookmarks, and the image files may be displayed in turns from an image file with a high-priority order. Hereinafter, embodiment 2 in which a function described above is achieved will be explained. In the following explanation, a "clip" is used as an equivalent word to a "bookmark", and both are used with the same meaning.

Figure 14:
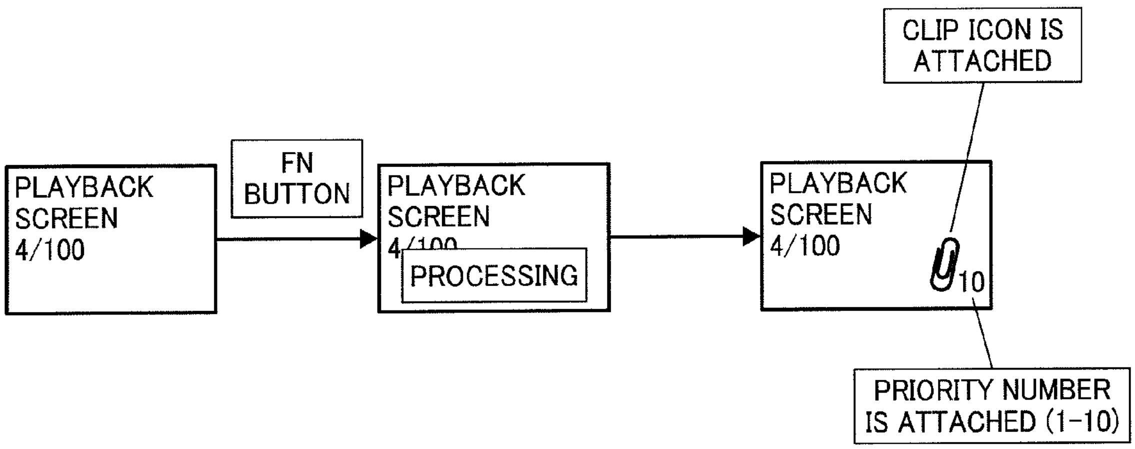
FIG. 14 is a flow chart illustrating a playback movement of an image in the above embodiment, namely, a flow chart illustrating a movement of setting a bookmark in embodiment 2 of the present invention.

FIG. 14 illustrates a movement of attaching a clip to a selected picture image to have a clip function. In order to attach a clip to an image file such as a timetable or the like, in a state where a picture image of the image file is displayed, a function button is pressed. And thereby, in an image screen displayed on the display 10, a clip icon is displayed on this displayed picture image. The movement so far is similar to the movement of embodiment 1; however, there are different points from embodiment 1 in that a plurality of image files are selected and a clip is attached to each of the image files, and a priority or a priority order is set to the selected image files. For example, the priority or the priority order is expressed by adding a number to a side of the icon which expresses the clip. A method of attaching the clip may be the same as in embodiment 1. For example, in a state where a plurality of image files are displayed, a desired image file is selected by a cursor, then the function button is pressed, and thereby the clip may be attached. Or a movement to attach a clip selected from a playback menu may be performed. In addition, for example, 10 clips are attached to image files in total and the priority is respectively set sequentially. A priority number of the 10 clips is user-selectable freely from among unused priority numbers of 1 to 10. In a clip playback mode, it is sequentially played back from a high-priority image file. An example in FIG. 14 illustrates that a clip is attached to a 4/100 image file, in other words, 100 picture images are shot and stored and a clip is attached to a 4th image file of the 100 image files, and its priority number is 10.

Figure 15:
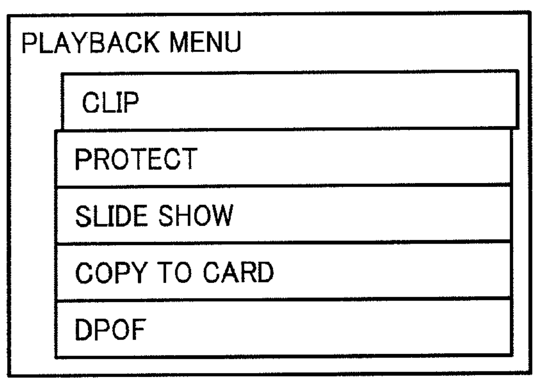
FIG. 15 illustrates an example of a playback menu image screen which is used in a case where a bookmark is set to an image file in the above embodiment.
Figure 16:
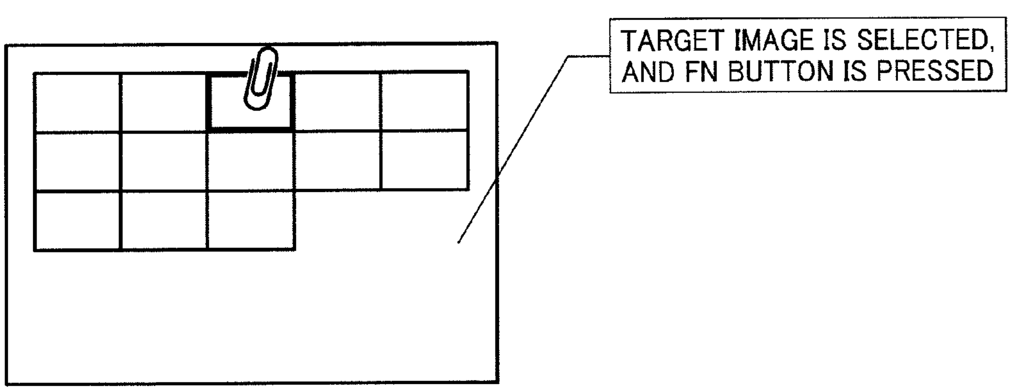
FIG. 16 illustrates another example of an image screen which is used in a case where a bookmark is set to an image file in the above embodiment.

FIGS. 15 and 16 illustrate various examples of methods of attaching the clip in the above embodiment. An example illustrated in FIG. 15 shows that, when an image file is displayed in the playback mode, in a case where the displayed image file is specified to be a preferentially displayed image file, the playback menu is displayed and a "clip" item of the menu is selected. An example illustrated in FIG. 16 shows that an image file which is desired to have a clip attached to from the plurality of the image files displayed in a thumbnail format is selected by a cursor, and in this state, the function button is pressed. And then when the cursor is moved to a different image file and the function button is pressed, a plurality of clips are attached to a plurality of image files.

Figure 17:
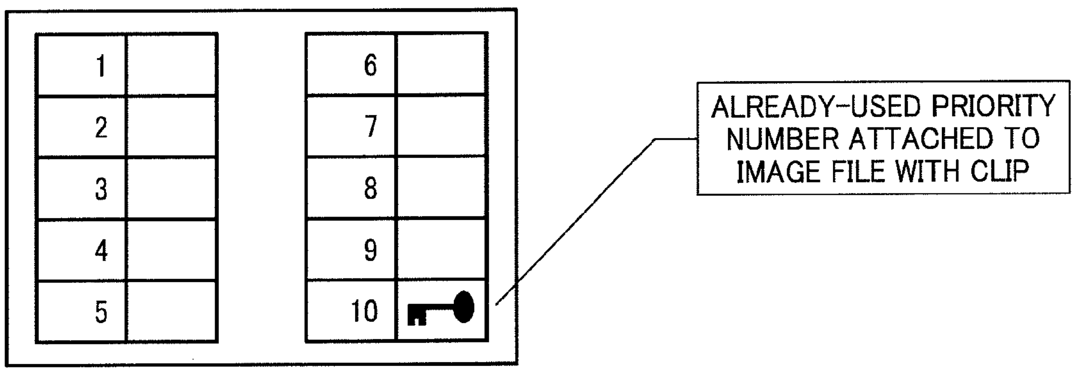
FIG. 17 illustrates still another example of an image screen which is used in a case where a bookmark is set to an image file in the above embodiment.

FIG. 17 illustrates an example of a clip map illustrating a status of use of clips in an example where the clips are attached to 10 image files. In this example, a priority number is attached to an image file where a clip is already attached, and the priority number is attached to the image file where the priority number has not been set. This example illustrates that only a priority number 10 is set, and when a clip is attached to an image file next, a priority number other than the priority number 10 can be selected. According to this example, it is advantageous for a user to easily recognize which priority numbers are not currently used.

A clip map image illustrated in FIG. 17 appears in order to decide a priority number, after selecting the image file with the clip in FIG. 16. After deciding the priority number by use of the clip map, the movement of attaching the clip is completed.

It is also possible not to set the priority to the image file with the clip. For example, a setting or an un-setting of the priority is selected by setting the priority to on/off. In a case where the priority is not set (setting of the priority to off), it is not necessary to display the clip map image illustrated in FIG. 17. And in a case where an image file with a clip is displayed in a thumbnail format, the image file with the clip may be displayed in chronological order in the thumbnail format.

Figure 18:
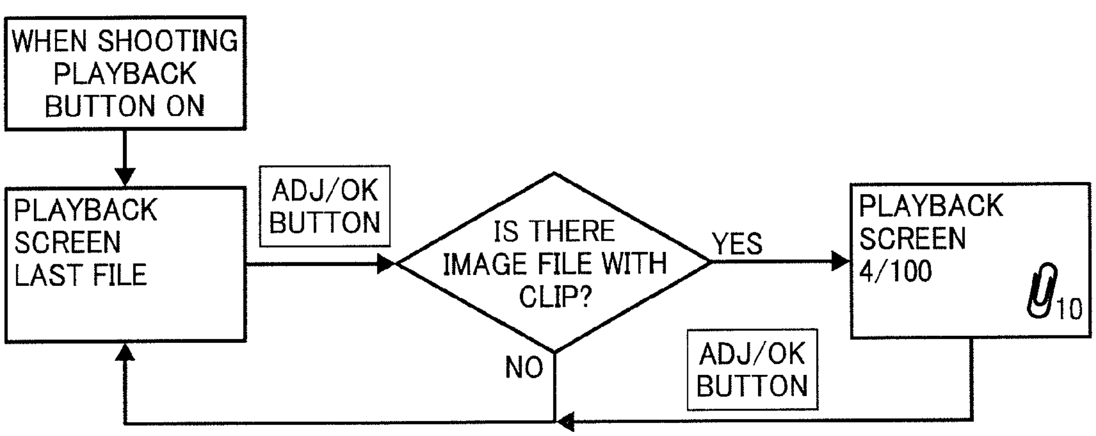
FIG. 18 is a flow chart illustrating a method of displaying an image file with a clip in the above embodiment.
Figure 19:
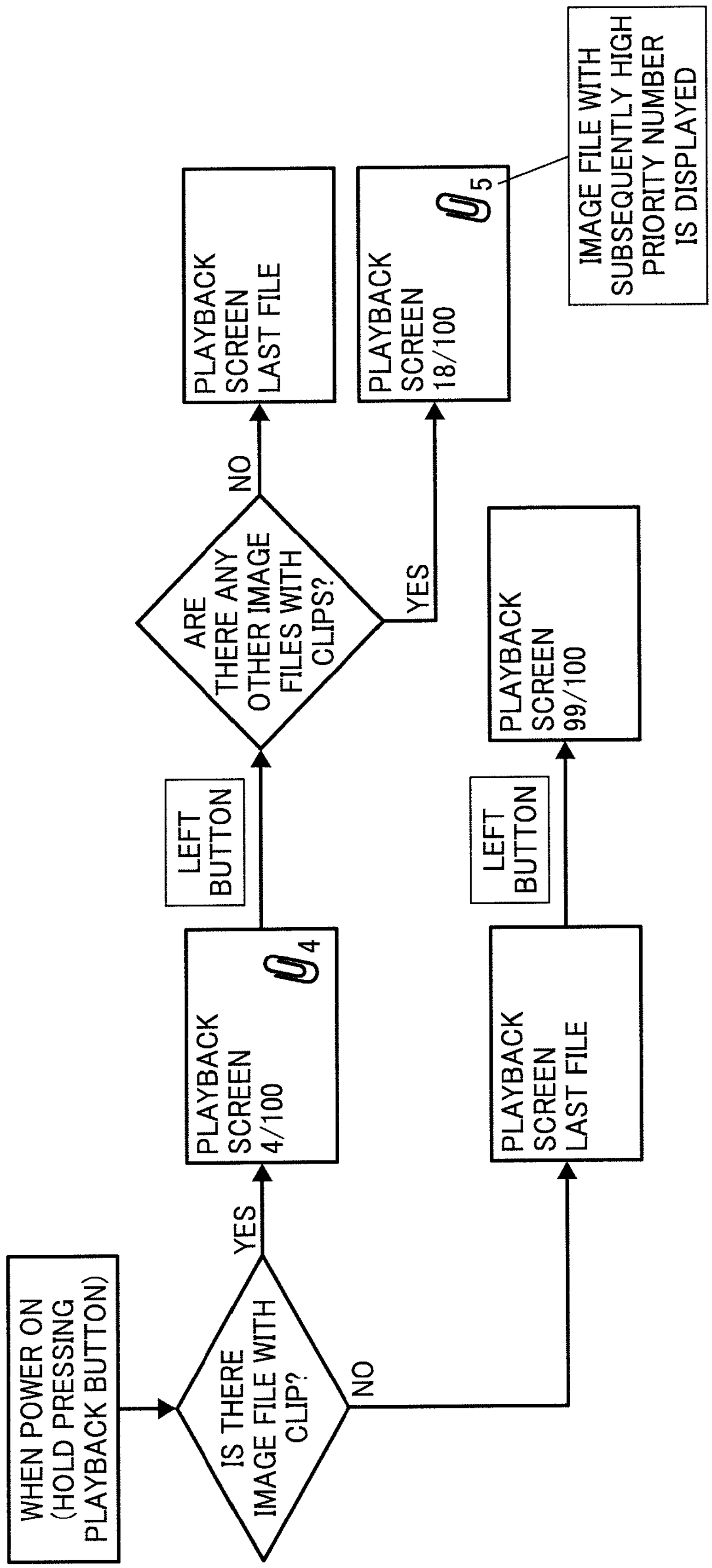
FIG. 19 is a flow chart illustrating another method of displaying an image file with a clip in the above embodiment.

FIGS. 18 and 19, in the above embodiment, illustrate a method of displaying an image file with a clip. FIG. 18 illustrates movement where a playback button is pressed when shooting. In the shooting mode, by pressing the playback button, an image file which was lastly shot and stored, that is, a LAST FILE (last file), is displayed. If an OK button of the OK/Cross key 8 is pressed at this time, and if there is the image file with the clip, the image file with the clip is displayed. And in a case where the above OK button is pressed again, it then returns to the LAST FILE, which is displayed again.

FIG. 19, in the above embodiment, illustrates an image file display movement when a digital camera is started-up by pressing the playback button for a predetermined time. After being started-up, it is judged if there is an image file with a clip or not, and in a case where there is the image file with the clip, the image file with the clip, for example, a 4/100 image file (a 4th image file, where a clip is attached, of 100 image files) is displayed. In this state, if a left button of the OK button of the OK/Cross key 8 is pressed, and if there are any other image files with clips, a subsequently high-priority image file (in this case, 18/100) is displayed. And if there is no other image file with a clip, the LAST FILE is displayed. If there is no image file with a clip, the LAST FILE is displayed, and in this state, when the left button of the OK button of the OK/Cross key 8 is pressed, an image file which was shot before the LAST FILE is displayed. As described above, the embodiment is structured such that the image files are displayed in turns from the latest image file (LAST FILE) toward old image files, that is, the image files are displayed in reverse chronological order.

Figure 20:
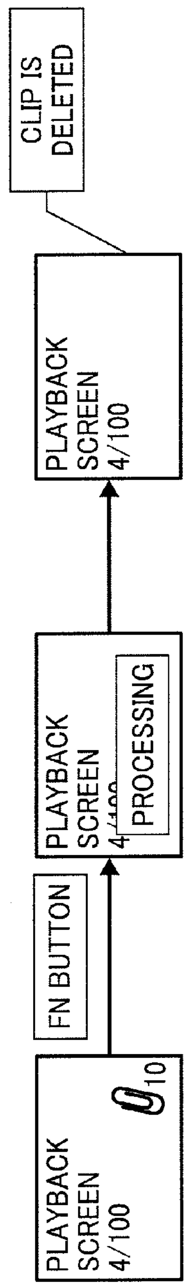
FIG. 20 is a flow chart illustrating a movement of deleting a clip of an image file with a clip in the above embodiment.
Figure 21:
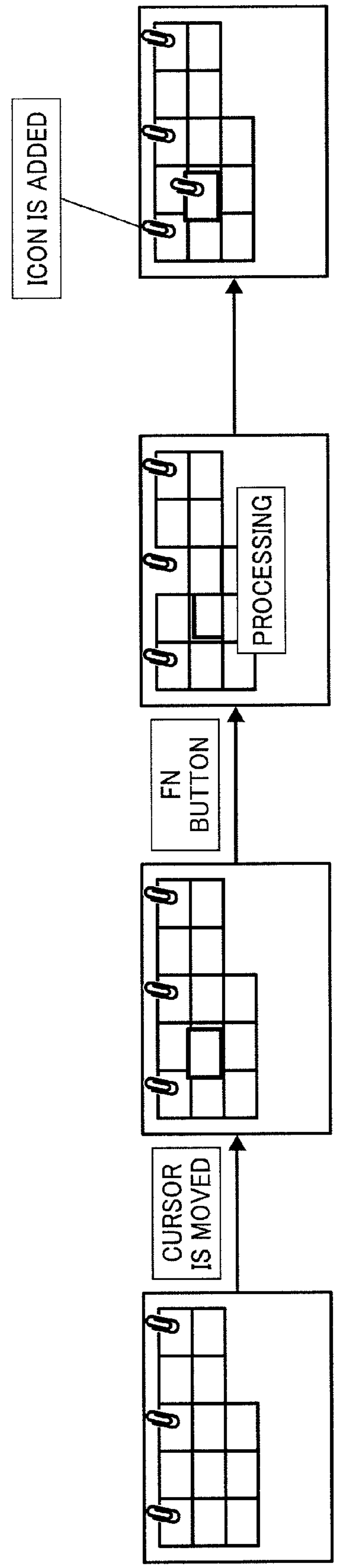
FIG. 21 is a flow chart illustrating a movement of changing a clip of an image file with a clip in the above embodiment.

FIGS. 20 and 21, illustrate a method of deleting a clip of an image file with a clip and a method of changing a clip of an image file with a clip to a different image file in the above embodiment. FIG. 20 illustrates a movement of deleting a clip. Like the method of deleting the bookmark illustrated in FIG. 9 of embodiment 1, in a state where an image file with a clip is displayed, a function button is pressed, and thereby the clip of the image file with the clip is deleted. In addition, in a case where a user wishes to attach a clip to another image file, an image file without a clip is displayed, and in this state, the function key is pressed, and thereby a change of the clip of the image file with the clip is substantially performed.

FIG. 21 illustrates another example of movements of adding and changing a clip. In a state where a plurality of image files are displayed in a thumbnail format, a cursor is placed in an image file without a clip and a function button is pressed, and a clip is attached to the image file. If there has been an image file with a clip, an image file without a clip is selected and the function button is pressed, and thereby a clip is attached to the image file, and this means that clips are attached to a plurality of image files. When the image file with the clip is selected and the function button is pressed, the clip of the image file with the clip is deleted. Thus, adding a clip, changing a clip of an image file with a clip to another image file, and deleting a clip of an image file with a clip are performed optionally.

In embodiment 2, a plurality of clips are attached to a plurality of image files per memory, that is, per external memory and per internal memory.

[Embodiment 3]

Next, embodiment 3 will be explained. Embodiment 3 makes it possible to attach a clip to an image file in a state where the magnification and a center position of an enlarged area of the image file are retained.

Figure 24:
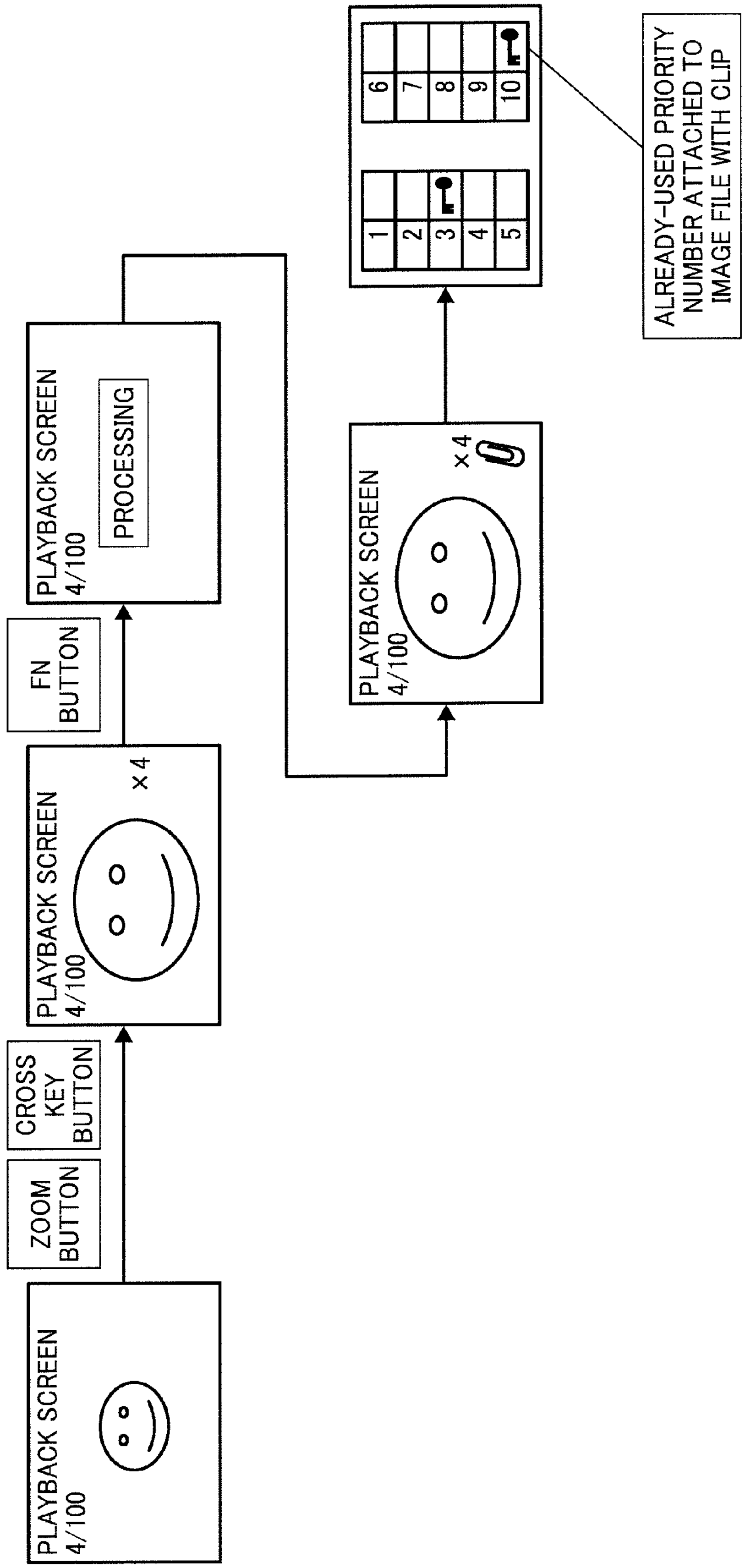
FIG. 24 is a flow chart illustrating a manner of attaching a clip to achieve a clip-and-enlarging function in the above embodiment.

FIG. 24 illustrates a method of attaching a clip to perform a clip-and-enlarging function.

Magnifications of enlarging a displayed picture image are changed to enlarging, for example, by operating a zoom operating member to a telephoto (TELE) side.

The magnifications may be changed in stages as follows.

For example, per operation, the magnifications may be changed, from a magnification of 1, that is, ×1→×1.2→×1.4→×1.7→×2.0→×2.4→×2.8→×3.4→×4.0→×4.8→×5.7→×6.7→×8.0→×9.8→×12.4→×16.0. In a case of reducing a picture image, for example, if it is structured to be changed reversely to the above magnification change, operating the zoom operating member to a wide-angle (WIDE) side makes it possible to obtain a desired magnification.

Regarding center coordinates of the enlarged area, a position in directions of right, left, up and down is determined by using a Cross key or the like. The magnifications and parameters of the center coordinates of the enlarged area which are set by the described above may be stored in a non-volatile memory such as an EEPROM (electrically erasable programmable read-only memory) or the like. Therefore, the image is displayed based on the parameters.

In FIG. 24, an image to which a user wishes to attach a clip for the clip-and-enlarging function is displayed on the display, and the image is enlarged at a desired angle of view by operating the zoom button and the OK/Cross key 8 or the like, and then the function button is pressed at the desired angle of view. Then, in the management file of the image file with the clip, information of the image file and information of the magnification and the center position at the angle of view which are desired to be recorded are stored. Henceforth, an ordinary method of attaching a clip has described so far is performed likewise.

In a case of starting-up in the playback mode, when the information of the magnification and the center position are stored in the management file with the information of the image file, the image file with the clip is enlarged based on the information of the magnification and the center position. On a displaying screen of the image file with the clip for the clip-and-enlarging function, as described in FIG. 24, an enlarged image of the image file, an icon illustrating a clip and a number illustrating the magnification at the time are displayed.

Figure 22:
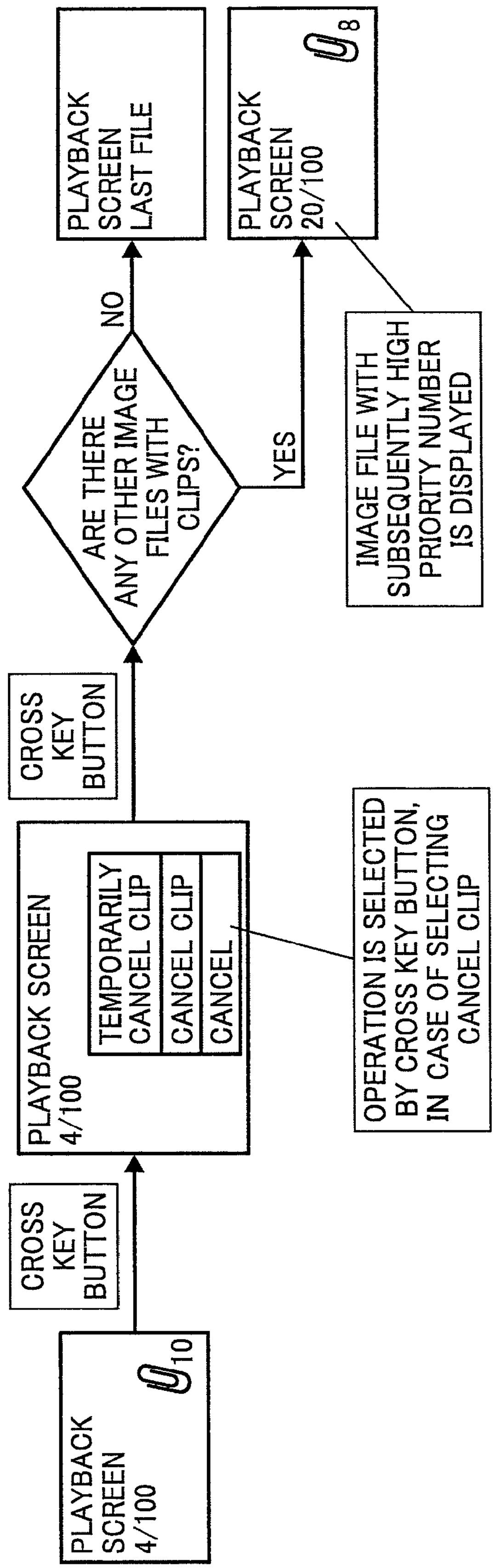
FIG. 22 is a flow chart illustrating a procedure of a movement of canceling an enlarged display of an image file with a clip in embodiment 3.

FIG. 22 illustrates a procedure of a movement of canceling an enlarged display of the image file with the clip. In a state where the image file with the clip is displayed on a playback screen, when a Cross key button is pressed, an image where one of items of "temporarily cancel clip", "cancel clip" and "cancel" should be selected is displayed on the playback screen, and the item of "cancel clip" is selected by an operation of the Cross key button. And thereby, the enlarged display is canceled, and an ordinary-size image is displayed. Here, the information of the magnification and the center position of the enlarged area are deleted from the management file; however, the clip remains to be attached to the image file.

Here when the Cross key button is pressed again, it is judged if there are any other image files with clips or not, and if there is an image file with a clip, a high-priority image file with a clip is played back and displayed. If there is no image file with a clip, an image file which was lastly shot is displayed. If there are image files with clips, high-priority image files with the clips are displayed from the order of higher priorities.

Thus, the movement of displaying the image file with the clip for the clip-and-enlarging function is similar to the movement of the above embodiment illustrated in FIGS. 12 and 13, and there is only a difference if the enlarged image is displayed or not. Therefore, details will not be explained.

Figure 23:
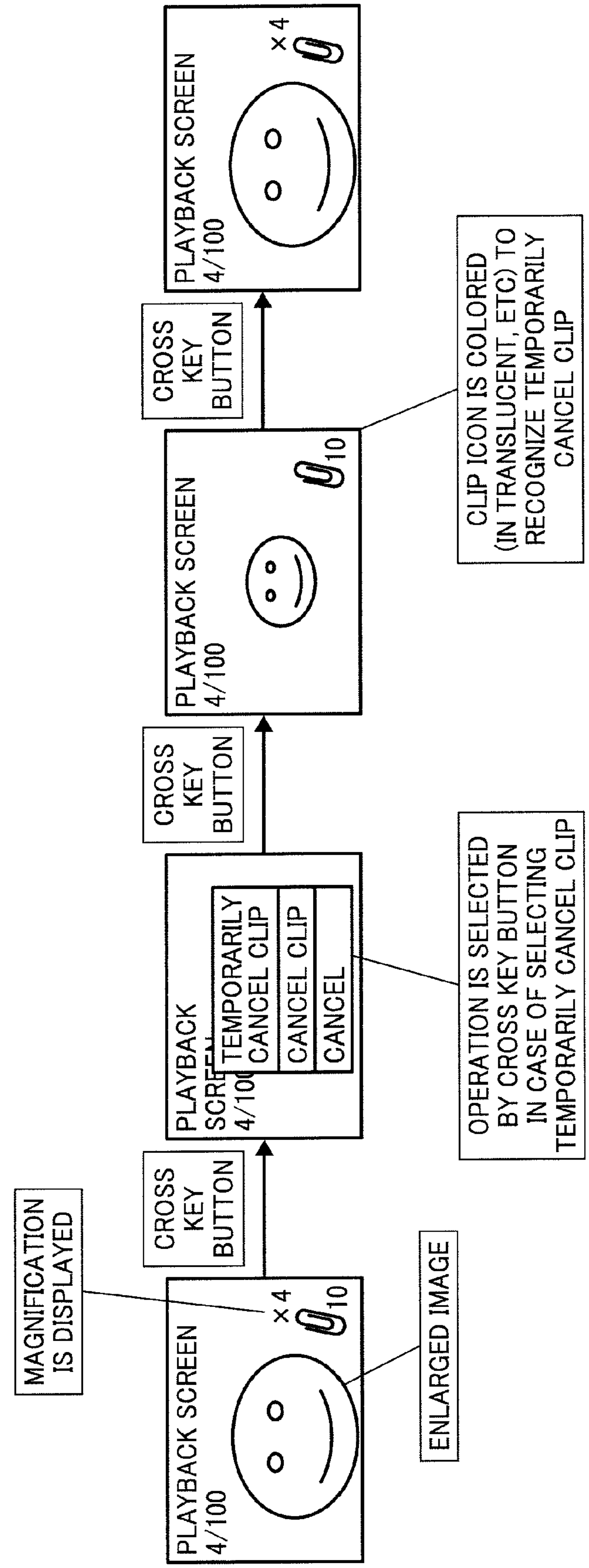
FIG. 23 is a flow chart illustrating a procedure of a movement of canceling temporarily an enlarged display of an image file with a clip in the above embodiment.

As described in FIG. 23, in a case where a user wishes to cancel the clip temporarily or the like, in a state where the image file with the clip is displayed as described above, the "temporarily cancel clip" is selected, and when an OK button of the OK/Cross key 8 is pressed, the clip is canceled temporarily. The "temporarily cancel clip" does not cancel a setting of the clip, but the clip is seemingly canceled temporarily. For example, there is a case where a picture image in which only a specific person in a family group photo is enlarged and is desired to be a priority image. In this case, a clip is attached to an image file such that a magnification and a center position where only the specific person is enlarged is retained. However, in a case where the picture image is displayed when starting-up in the playback mode, if only the enlarged priority picture image is displayed, it is hard to recognize where or which part in the whole picture image is enlarged. And to cancel an enlarged display only temporarily is called the "temporarily cancel clip". When the "temporarily cancel clip" is selected, a whole photo having a magnification when shooting, that is, in the above example, the family group photo is displayed. Then, when once a different image is displayed and the above family group photo is played back, the "temporarily cancel clip" is canceled. Therefore, the image file with the clip is displayed in a state where the magnification and the center position are originally set. When the "temporarily cancel clip" is performed, a color of the icon of the clip is changed to, for example, a translucent color or the like to recognize that a display of the enlarged image with the clip is canceled and the whole picture image is displayed. And thereby, it is easy to recognize that the "temporarily cancel clip" is performed at a glance.

In a case returning to a setting before the setting of the clip-and-enlarging function (an original setting), the above OK button of the OK/Cross key 8 is pressed, or a different picture image is displayed by use of an up-down-right-and-left key of the OK/Cross key 8 or the like to recall original enlarging parameters, and thereby the original setting may be restored.

[Embodiment 4]

Next, a structure example of a recorder for management information which records management information of the image file with the clip will be explained.

Figure 25:
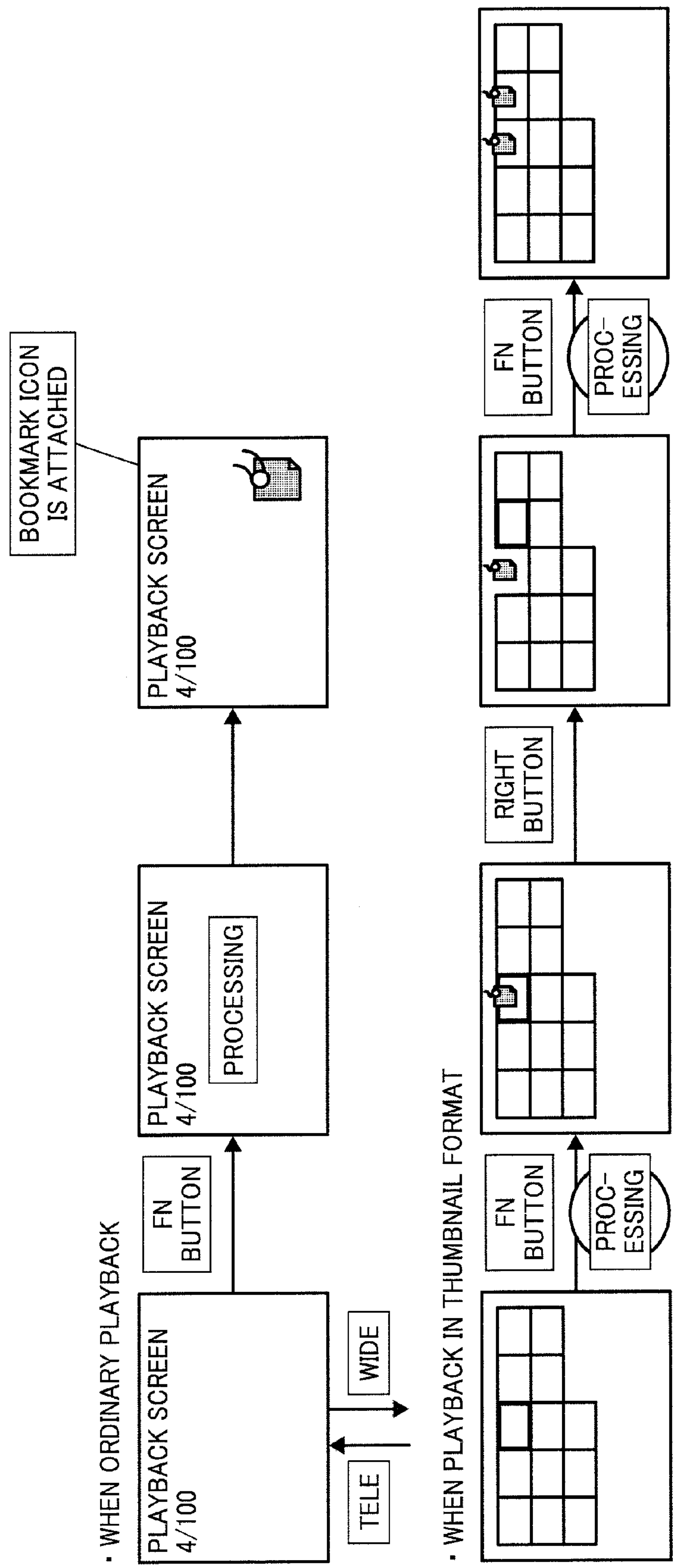
FIG. 25 is a flow chart illustrating a movement of a clip function in a playback mode in embodiment 4
Figure 26:
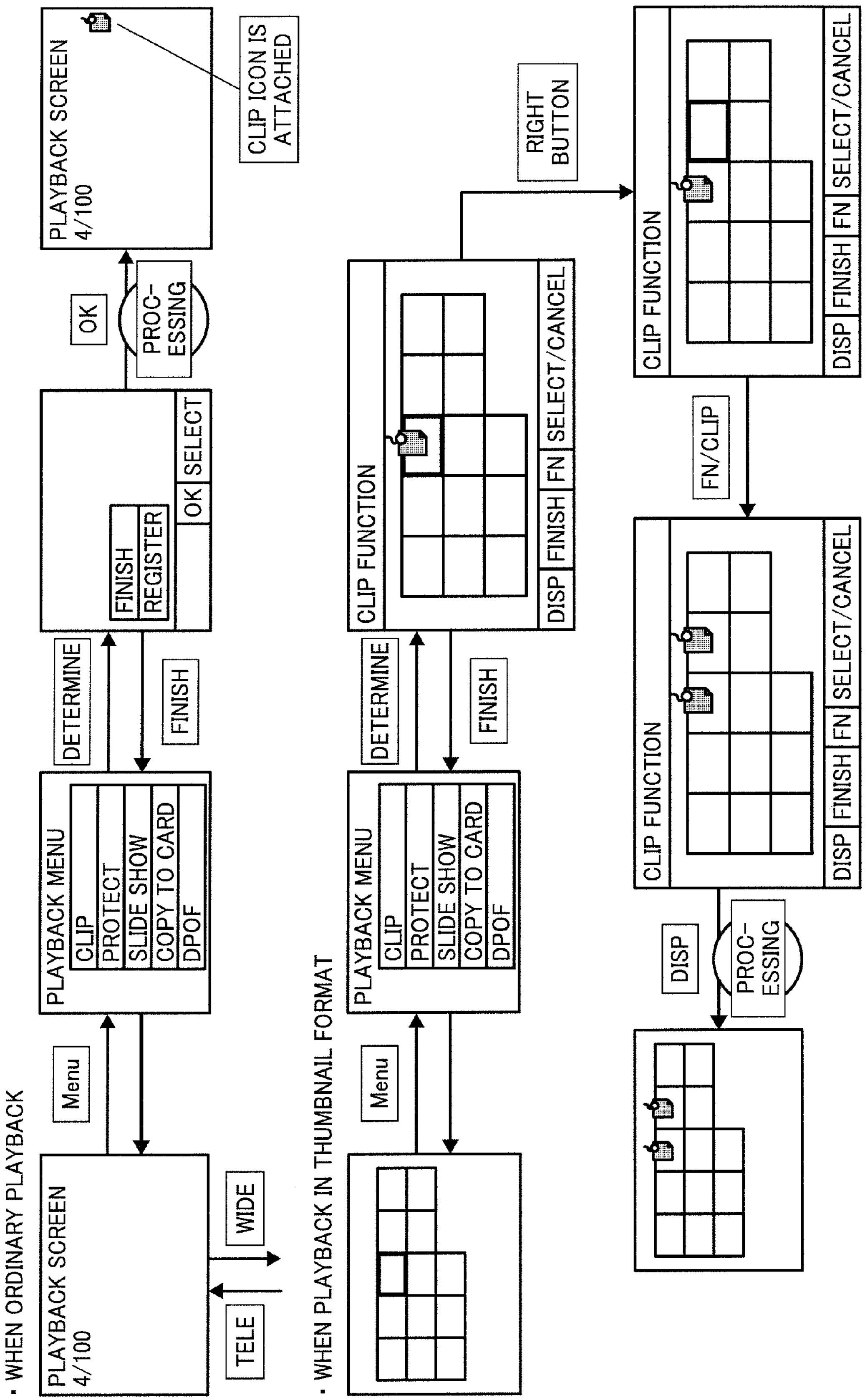
FIG. 26 is a flow chart illustrating another movement of a clip function in a playback mode in the above embodiment

FIGS. 25 to 26 illustrate movements of a clip function in the playback mode. FIG. 25 illustrates a movement when the function button is pressed in an ordinary playback mode. Firstly, an image file which a user wishes to play back preferentially from among a plurality of image files, that is, an image file which a user wishes to immediately play back and check when necessary, is displayed. Next, when the function button is pressed in this state, a marker or a clip icon, which illustrates a picture image which is preferentially displayed on the LCD, is displayed, and management information, which illustrates that the picture image is an image file with a clip, is recorded. Details of recording of the management information will be explained later. When a user wishes to attach clips to a plurality of image files, the images to which the user wishes to attach clips are searched by sending displayed picture images forward/backward, and target images are displayed and the operation described above is performed repeatedly.

FIG. 25 illustrates a 4/100 picture image screen, that is, 100 images are stored in a recording medium and a clip is attached to a 4th of 100 images.

In FIG. 25, in a state of an ordinary 1 picture image playback display in the playback mode, when a zoom lever is turned to the WIDE (wide-angle) side, as illustrated in a bottom of FIG. 25, a plurality of image files are displayed in a thumbnail format, in other words, in a grid playback screen. In this grid playback screen, a target frame is displayed on an image file which is currently selected. This target frame is moved by the Cross key, and an image file which the user wishes to preferentially display from among the plurality of image files, that is, an image file which the user wishes to immediately check when necessary is selected. Next, when the function button is pressed in this state, a marker or a clip icon, which illustrates the image file which is preferentially displayed on the LCD, is displayed, and management information, which indicates that the image file is the image file with the clip, is recorded. In a case where a user wishes to attach clips to a plurality of image files, the above operation where an image file is selected and a clip is attached by the function button may be performed repeatedly, or an operation, where a plurality of image files to which the user wishes to attach clips are specified beforehand by the function button and confirmed by the OK/Cross key 8 after being specified, may be performed collectively.

FIG. 26 illustrates another structure example of the recorder for management information which records the management information of the image file with the clip. In the ordinary playback mode, in a case where a clip is attached to a predetermined image file, firstly, an image file which a user wishes to preferentially play back among from a plurality of image files is displayed. Next, a menu key is pressed in this state, and a playback setting menu is displayed. An item of "clip function" is selected by the Cross key from the playback setting menu which is displayed, and when a right button of the OK/Cross key 8 is pressed in this state, a next setting screen image, that is, items of "End" and "Register" are displayed. And then when the "Register" is selected and determined from the displayed setting screen image by the OK/Cross key 8, a clip icon, which illustrates an image file which is preferentially displayed on the LCD, is displayed with the image file, and management information, which indicates the image file to which the clip is attached, is recorded.

In FIG. 26, when the zoom lever is turned to the WIDE (wide-angle) side from the ordinary 1-image playback display in the playback mode, as illustrated in a bottom of FIG. 26, a plurality of image files are displayed in a thumbnail format, that is, in a grid playback screen. In the grid playback screen, a target frame is displayed on the image file which is currently selected. This target frame is moved by the Cross key, and an image file which a user wishes to preferentially display from among the plurality of the image files is selected. When the menu key is pressed in this state, the playback setting menu is displayed. The item of "clip function" is selected by the Cross key of the OK/Cross key 8 from the playback setting menu which is displayed. When the right button of the Cross key is pressed in this state, a clip icon is displayed with a different picture image from a displayed picture image of an image file which is previously specified, and in a next grid playback screen, the clip function setting screen is displayed. In this clip function setting screen, items of "DISP (display) End" and "Select Fn (function)/Release" are displayed with a thumbnail index of the image files. When the DISP (display) button is pressed in this state, management information, which indicates the image file to which the clip is attached, is recorded.

In a case where a user wishes to attach clips to a plurality of image files, an operation, where an image file to which the user wishes to attach a clip is selected by the Cross key and the function button is pressed, is performed repeatedly.

Next, details of recording of the management information which illustrates the image file to which the clip is attached will be explained. FIG. 27 illustrates an example of methods of recording and controlling the image with the clip using a MakerNote tag in the Exif (exchangeable image file format). This example is a method of putting management information in an image file. As to a digital camera, a specification for a file format is determined by a specification for a file format for a digital still camera, that is, "Exif". In a header of the Exif, there is a MakerNote tag which is uniquely settable by a manufacturer, and where the management information is put in a file. For example, as a method of putting the management information, an area, where a tag ID illustrating information regarding the clip function (clip information) and a flag judging if the image file is an image file with a clip or not are recorded, is provided. A method of judging if the image file is an image file with a clip or not is that a target image file is read, the tag ID illustrating the clip information in the MakerNote tag is searched, and information of the flag is checked.

Figure 28:
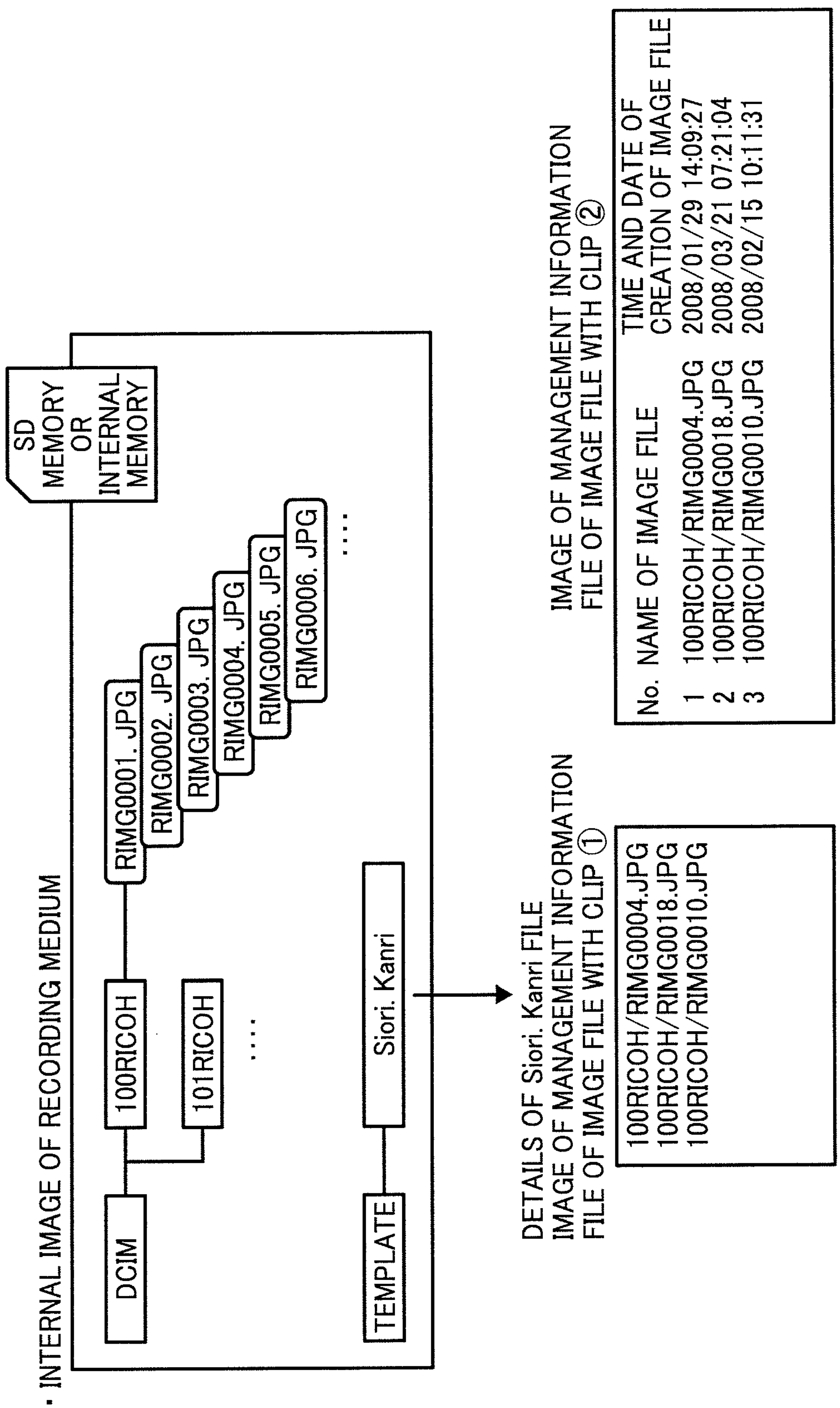
FIG. 28 is a diagram illustrating another example of a management information file of an image file with a clip which is applicable to the above embodiment.

FIG. 28 illustrates another example of a method of recording the management information which illustrates the image file to which the clip is attached (the image file with the clip), and illustrates a method of recording in a recording medium as a different file from the image file. In the recording medium such as an external or internal memory, according to a DCF (design rule for camera file system) specification, there are a DCIM (digital camera images) folder under a root directory, and a 100RICOH folder which stores a recording/playback target image file under the DCIM folder, and in the 100RICOH folder, a plurality of image files, RIMG0001.JPG, RIMG0002.WC3 RIMG0003.JPQ, etc as shot image files are stored. There is a similar directory structure in the internal memory. In this example, similar to the example illustrated in FIG. 11, under the root directory, a template folder is created, and in which a management file called "Siori.Kanri" which manages the image file with the clip is stored.

Next, details of the "Siori.Kanri" file will be explained. The "Siori. Kanri" file indicates a management information file which manages the image file with the clip. In the management information file which manages the image file with the clip, only a name of the image file with the clip is written. Each time an operation where a clip is attached to an image file (clip operation) is performed, a name of a target image file is written in turns from the top. In a first example of the management information file which manages the image file with the clip illustrated in a bottom left of FIG. 28, 3 image files of RIMG0004.JPG, RIMG0018.JPG and RIMG0010.JPG are image files with clips attached. In a second example of the management information file which manages the image file with the clip illustrated in the bottom right of FIG. 28, a name of the image file with the clip and other information regarding the image file are written together. The example illustrated in the bottom right of FIG. 28 illustrates that a management number (file number), the name of the image file and time and date of a creation of the image file are written, and 3 image files of RIMG0004.JPG, RIMG0018.JPG and RIMG0010.JPG are the image files with the clips.

Regarding a priority order in a case where an image file to which a clip is attached is displayed, image files may be displayed in order of being written in the "Siori.Kanri" file, or in order of the file number of the image file. Or an order of the time and date of the creation of the image file may be considered, too.

Figure 29:
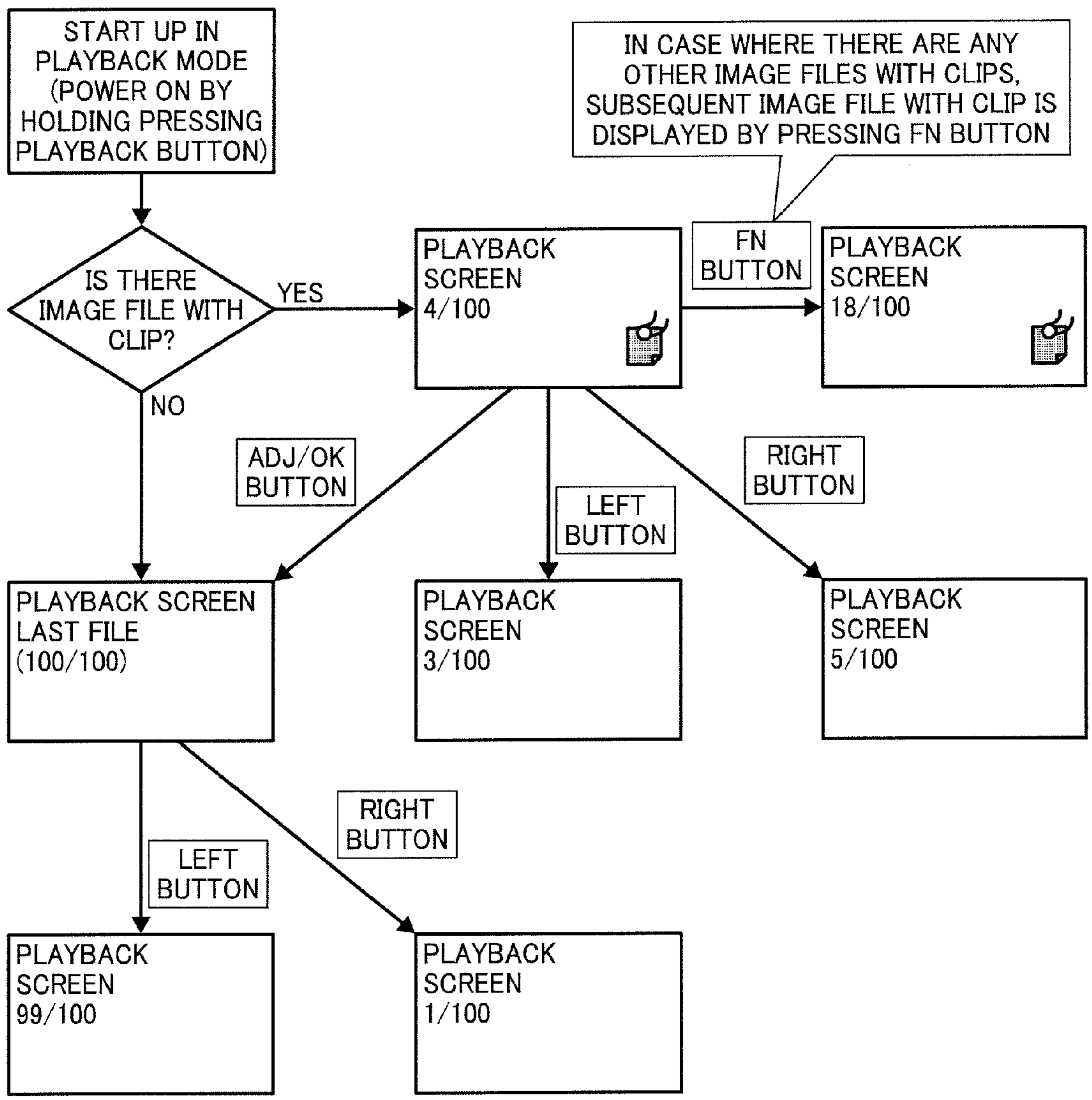
FIG. 29 is a flow chart illustrating a movement of playback of an image file with a clip in the above embodiment.
Figure 30:
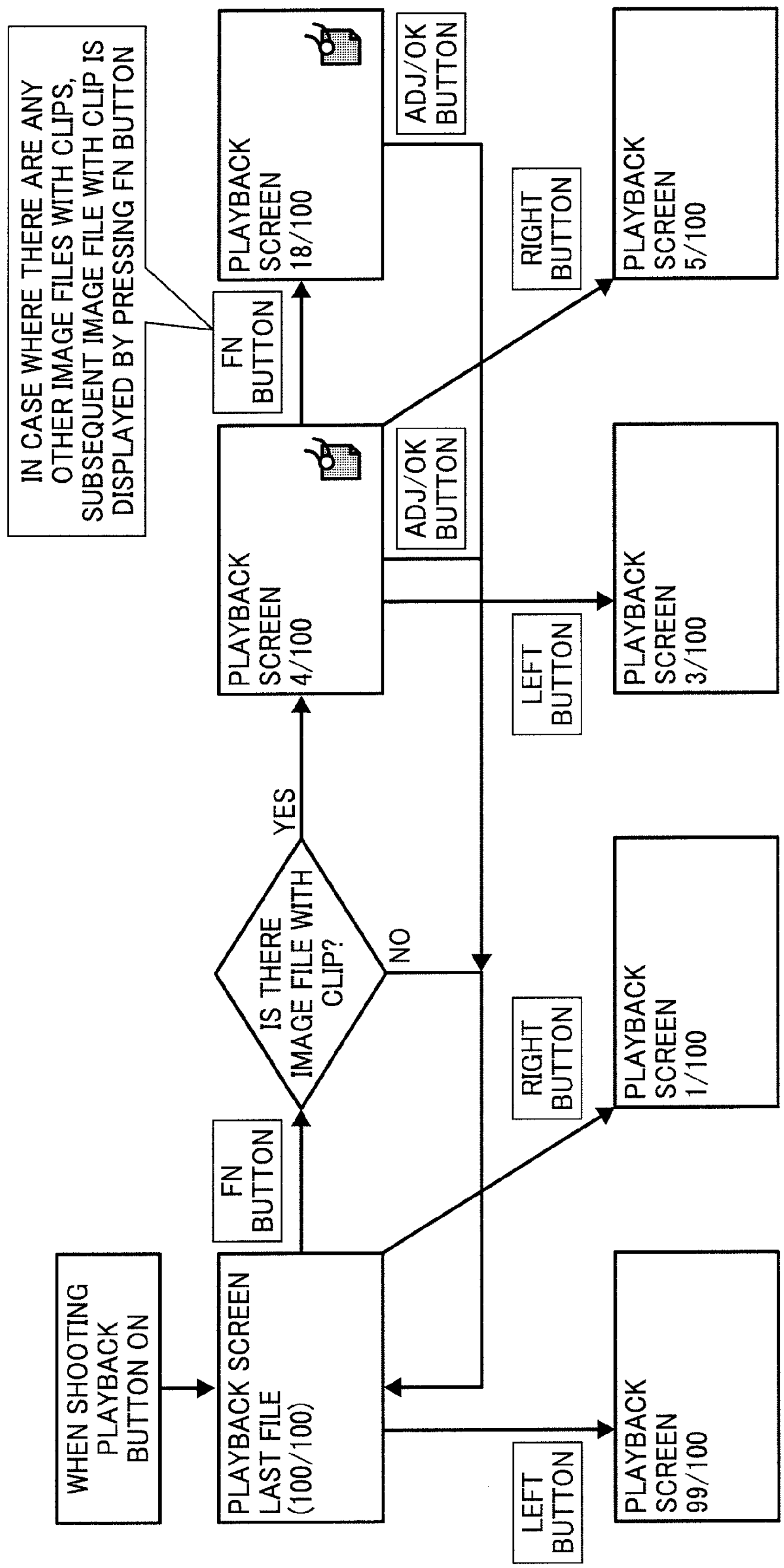
FIG. 30 is a flow chart illustrating another movement of playback of an image file with a clip in the above embodiment.

In the above embodiment, FIGS. 29 and 30 illustrate flow charts of a playback flow of the image with the clip. FIG. 29 illustrates a movement in a case of starting-up in the playback mode. Firstly, starting-up in the playback mode by a long press on the playback button, and a check of an existence of an image file with a clip is performed. In a case where information which indicates that a clip is attached is recorded in the image file, header information of all the image files in the recording medium are searched, and if there is an image file with a clip, for example, an information table of the image file is created and stored in SDRAM.

In a case where there is a management information file which manages the image file with the clip as a different file, the management information file is read in SDRAM.

In the check of the existence of the image file with the clip, in a case where there is an image file with a clip, the image file with the clip is displayed, and in a case where there is no image file with a clip, a LAST FILE, that is, an image file which was lastly shot is displayed. In a case where there are a plurality of image files with clips, an image file with the highest-priority is firstly displayed. When the function button is pressed in this state, a display of the image file with the clip is switched in turns based on a priority of the image file with the clip each time this button is pressed. In a case of a format of the management information file of the image file with the clip described in FIGS. 27 to 28, for example, in order of being written in the management information file, the image files are displayed as RIMG0004.JPG→RIMG0018.JPG→RIMG0010.JPG→RIMG0004.JPG→, and in order of the file number of the image file, the image files are displayed as RIMG0004.JPG→RIMG0010.JPG→RIMG0018.JPG→RIMG0004.JPG→.

In a state where the image file with the clip is displayed, in a case where a left key of the Cross key is pressed, a previous image file of the image file which is currently displayed is displayed, and in a case where a right key of the Cross key is pressed, a following image file of the image file which is currently displayed is displayed. In addition, in the state where the image file with the clip is displayed, in a case where an ADJ (adjustment). OK button is pressed, the display returns to the LAST FILE.

FIG. 30 illustrates a movement of switching from the shooting mode to the playback mode. When the playback button is pressed in the shooting mode, an operation mode of a camera is switched to the playback mode, and firstly an image file which was lastly shot and stored, or an image file with the largest file number, that is, a LAST FILE, is displayed. When the function button is pressed in this state, in a case where there is an image file with a clip, the image file with the clip is displayed. If there are a plurality of image files with clips, the image file with the highest-priority is firstly displayed. When the function button is pressed in this state, the display of the image file with the clip is switched in turns based on the priority of the image file with the clip. In a case of the management information file of the image file with the clip illustrated in FIG. 28, for example, in order of being written in the management information file, the image files are displayed as RIMG0004.JPG→RIMG0018.JPG→RIMG0010.JPG→RIMG0004.JPG→, and in order of the file number of the image file, the image files are displayed as RIMG0004.JPG→RIMG0010.JPG→RIMG0018.JPG→RIMG0004.JPG→. In addition, in the state where the image file with the clip is displayed, in a case where an ADJ. OK button is pressed, the display returns to the LAST FILE.

Here, a check of an existence of an image file with a clip is performed as follows. When starting-up the camera, in a case where information which indicates that a clip is attached is recorded in the image file, header information of all the image files in the recording medium is searched. And if there is an image file with a clip, an information table of the image file is created and stored in SDRAM.

In a case where there is a management information file which manages the image file with the clip as a different file, the management information file may be read in SDRAM, or the above operation may be performed when switching from the shooting mode to the playback mode.

Figure 31:
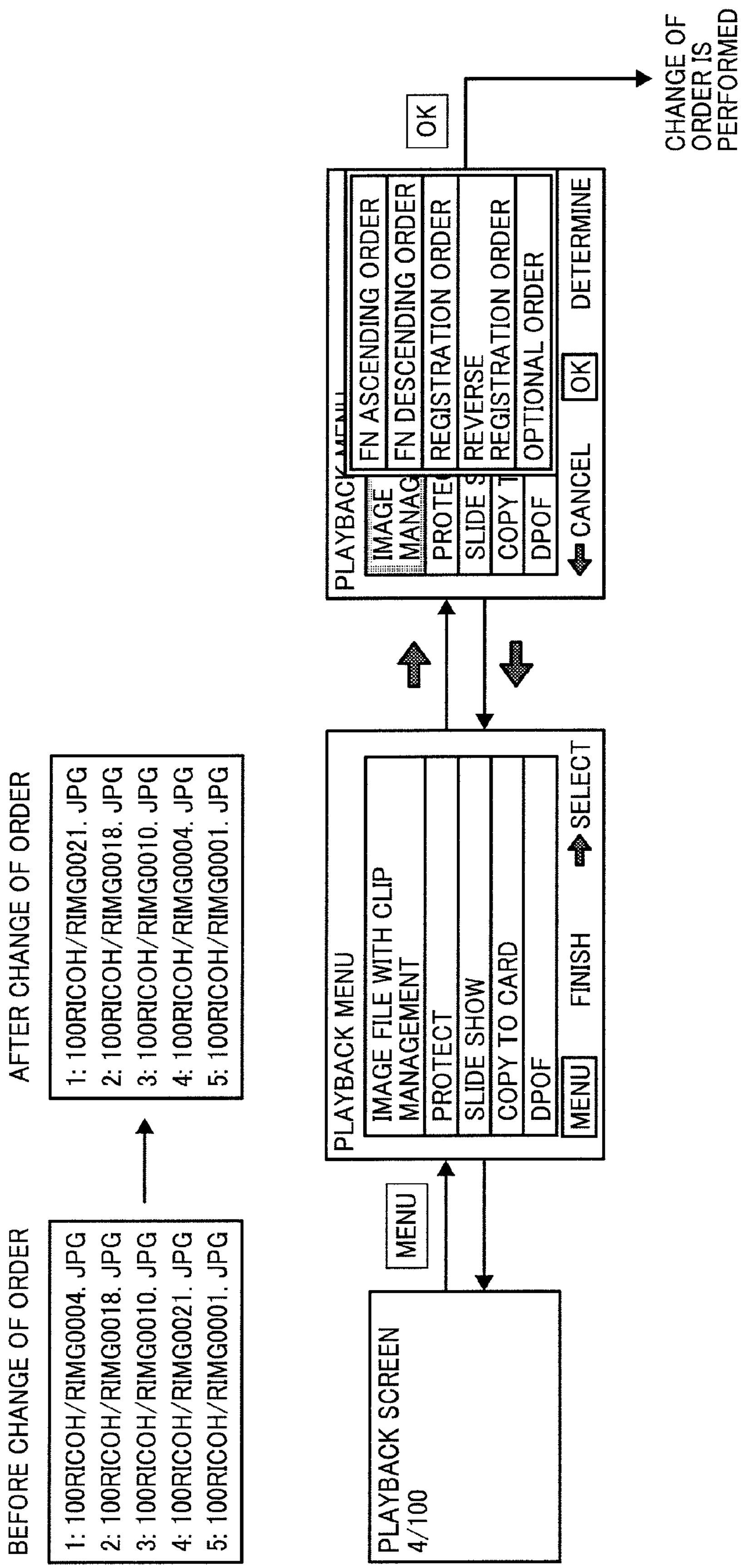
FIG. 31 is a conceptual diagram illustrating a movement of changing an order of playback of an image file with a clip in the above embodiment.
Figure 32A:
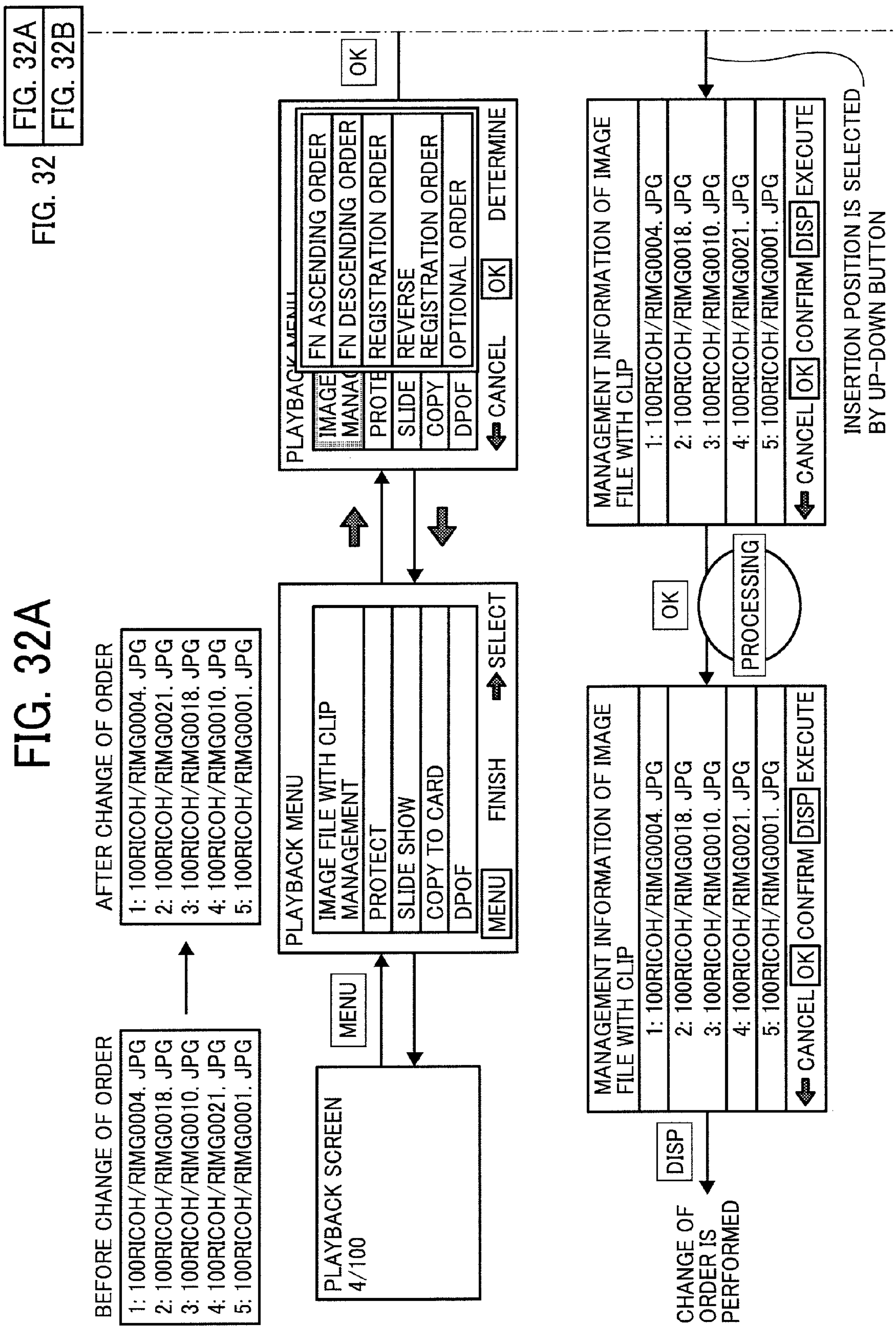
FIG. 32 is another example of a conceptual diagram illustrating a movement of changing an order of playback of an image file with a clip in the above embodiment.
Figure 32B:
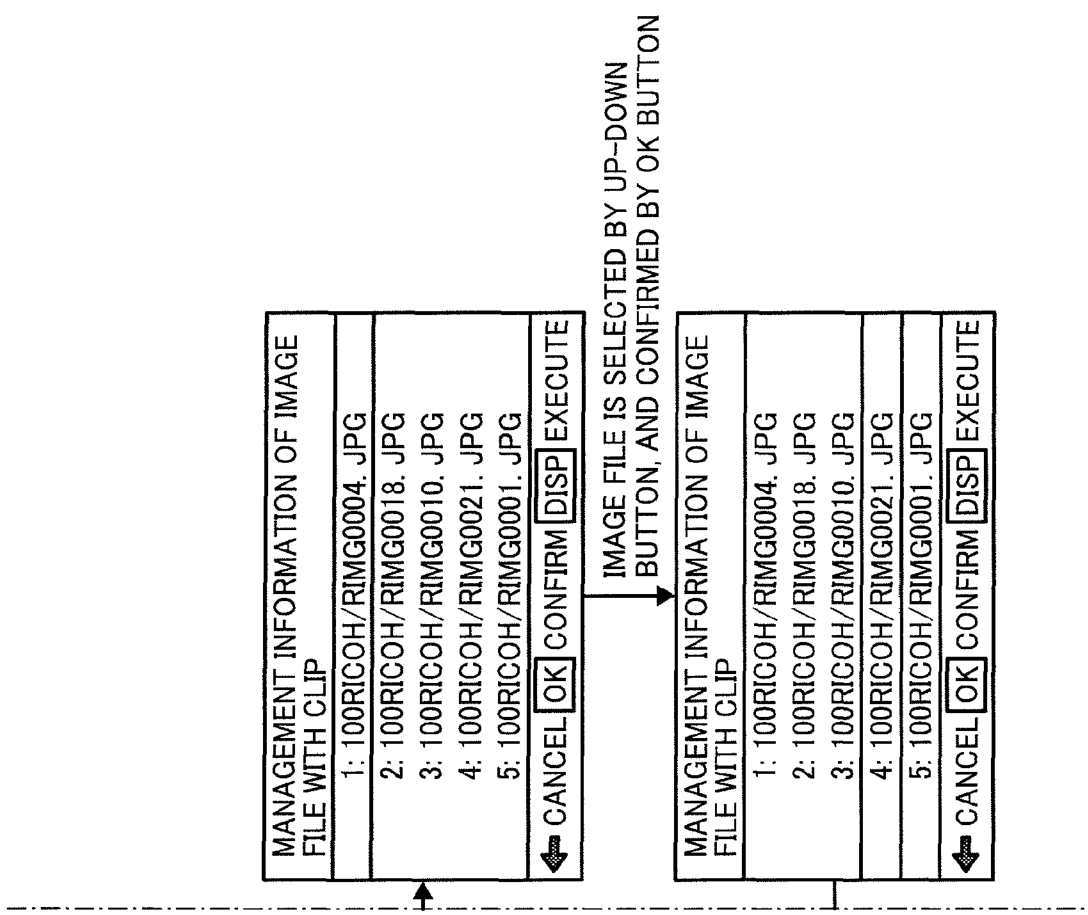

FIGS. 31 and 32 are flow charts explaining an order of playing back the image file with the clip, that is, a change of priority. FIG. 31 illustrates an example of an automatic change of priority. In the playback mode, when the menu key is pressed, the playback setting menu is displayed. An item of "image file with clip management" from the playback setting menu is selected by the Cross key. When the right button of the Cross key is pressed in this state, items of the image file with clip management are displayed, and one of them is selected by the up-down button of the Cross key. Here, 4 examples are displayed such as "FN ascending order" which arranges the image files in ascending order of file numbers, "FN descending order" which arranges the image files in descending order of file numbers, "registration order" which arranges the image files in registration order of the image files, and "reverse order of registration" which arranges the image in the reverse order of registration of the image files. After one of the items is selected, the MENU button or the OK button is pressed and the setting is confirmed, and management information file of the image file with the clip is rewritten, and thereby the change of priority is performed.

FIG. 31 illustrates an example of selecting and confirming "FN descending order". When the "FN descending order" is performed as illustrated in FIG. 31, the management information file of the image file with the clip is rewritten as a state after the management information file is rewritten from the state before.

FIG. 32 illustrates an example of a change of priority of the image file with the clip by optionally setting the priority according to user's needs. The playback setting menu is displayed from the playback mode, and when "Optional order" from among items of the image file with clip management is selected by the up-down button of the Cross key and the MENU/OK button is pressed, management information of the image files with the clips which is currently set (a list of registered image files with clips) is displayed based on contents of the management information file of the image file with the clip in SDRAM. In this state, an optional image file is selected by the up-down button of the Cross key and confirmed by the MENU/OK button. And then an insertion position is selected by the up-down button of the Cross key and determined by the MENU/OK button. In a case of performing a change of priorities of a plurality of image files, the above procedure is repeated. After performing the change of priority of the image file, a change operation described above is confirmed by pressing the DISP button, and the management information of the image file with the clip is rewritten.

[Embodiment 5]

In an imaging apparatus according to embodiment 5 of the present invention, a GPS is installable. An output of a received signal of a GPS antenna 51 is supplied to a GPS unit 52 illustrated in FIG. 1. The GPS measures a current position by use of a plurality of satellites. From the satellites of the GPS, spread-spectrum data, a pseudo-random noise (PRN) code which is determined by each satellite, is broadcasted. Each satellite is identified by this PRN code. In addition, orbit information, time information and its correction information by an installed atomic clock are transmitted. Signals from the GPS satellites are received from the GPS antenna 51, and an output of this received signal is supplied to the GPS receiving unit 52. The received signal from the GPS satellite is demodulated by the GPS receiving unit 52, and information on the current position is obtained based on a time difference of a transmission delay time from each GPS satellite. Information on the current position is outputted as information of the latitude and the longitude, for example. An output from this GPS receiving unit 52 is supplied to a system controller 40.

Additionally, in this imaging apparatus, an area judging table 53 illustrated in FIG. 36 described later is provided. The area judging table 53 is a memory in which area information corresponding to a predetermined location information is stored beforehand as a table. This area judging table is stored in a non-volatile memory such as a ROM, an EEPROM, a flash memory or the like. This area judging table 53 may be renewable by a personal computer, for example. Data of this area judging table 53 may be downloadable from a network.

Next, a movement of above embodiment 5 will be explained. The following operation is basically performed in accordance with a control program stored in a ROM in a CPU comprising the system controller 40. Similar to each described embodiment, in embodiment 5, a bookmark or a clip is also attached to a specific image file if necessary and the image file with the bookmark (clip) is preferentially displayed. In addition to the above function, in embodiment 5, for example, information on a current location where the imaging apparatus actually exists is obtained by a GPS function which is provided, and this information is used. Embodiment 5 has a different function from the above-described embodiments; therefore, a different structure and function from other embodiments will be mainly explained.

Figure 33:
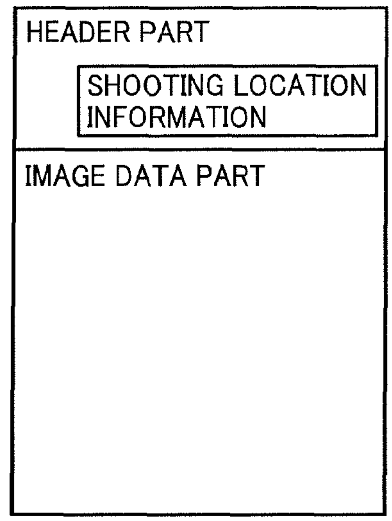
FIG. 33 is a diagram illustrating a structural example of an applicable image file in embodiment 5.

FIG. 33 illustrates a structure example of an image file shot by the imaging apparatus according to the present embodiment having the GPS function. Each shot image file, as illustrated in FIG. 33, comprises a header part and a image data part. In the image data part, various additional information of shot images such as a number of pixels, a compression type, shooting date and time and so on, and shooting location information are recorded.

Figures 35, 36:
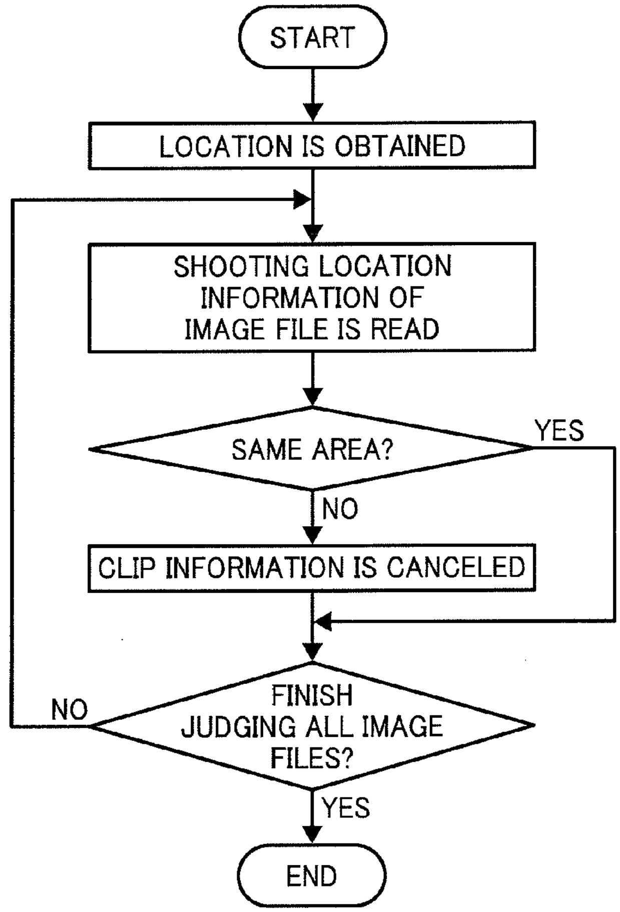
FIG. 35 is a flow chart illustrating an example of a movement of canceling a clip which is attached in the above embodiment.
FIG. 36 is a diagram illustrating an example of data structure of an area judging table used in the above embodiment.

FIG. 36 illustrates an example of a data structure of the area judging table 53. As described above, the area judging table 53 is stored in the non-volatile memory such as a ROM, an EEPROM, a flash memory or the like, and the table of the area information is stored beforehand. In the area judging table 53, as described in FIG. 36, location information of various areas is illustrated by a list of the latitude and the longitude. The area judging table 53 has items of an index number, area information 1 of a large classification category, area information 2 of a middle classification category, the latitude and the longitude, as illustrated in FIG. 36. The index number is expressed by a serial number. When shooting, an area index number corresponding to location information of a shooting location is written in a recording part of shooting location information of the header part of the shot image file. In items of the area information 1 and 2, specific names which express the area are written. In items of the latitude and the longitude, the latitude and the longitude of the location of the area information are written.

Figure 34:
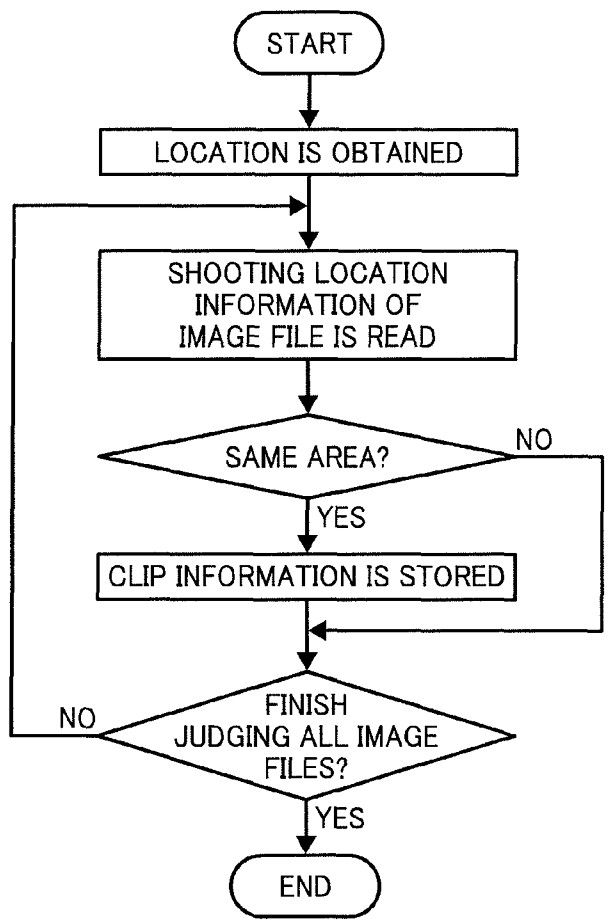
FIG. 34 is a flow chart illustrating an example of setting a clip in the above embodiment.

FIG. 34 is a flow chart illustrating an example of a clip setting. In this example, a current location is measured by the GPS, and the shooting location information stored in the image file and the current location are judged if they are in the same area or not referring to the area judging table 53. If they are in the same area, a setting of the clip information is performed on the image file. In FIG. 34, current location information of an imaging apparatus is obtained by the GPS unit 52. When the current location information of the imaging apparatus is obtained by the GPS, the shooting location information of the image file is obtained by accessing the header part of the image file stored in the recording medium. When this information is obtained, referring to the information written in the area judging table 53, the shooting location of the image file and the current location are judged if they are in the same area or not. If they are in the same area, the clip information indicating an image file which is preferentially displayed is stored in the header part of the image file. If they are not in the same area, or in a case where the shooting location information is not stored in the image file, no operation is performed. The above operation is performed on all the image files stored in the recording medium.

FIG. 35 is a flow chart illustrating an example of a movement of canceling a clip attached as described above. In this example, a current location is measured by the GPS, and the shooting location information stored in the image file in which the clip information is set (the image file with the clip setting) and the current location are judged if they are in the same area or not referring to the area judging table 53. If they are not in the same area, a cancelation of the clip information setting is performed on the image file. In FIG. 35, current location information of an imaging apparatus is obtained by the GPS unit 52. When the current location information of the imaging apparatus is obtained by the GPS, the shooting location information of the image file is obtained by accessing the header part of the image file with the clip setting stored in the recording medium. When this information is obtained, referring to the information written in the area judging table 53, the shooting location of the image file and the current location are judged if they are in the same area or not. If they are not in the same area, the clip information stored in the header part of the image file is deleted. If they are in the same area, or in a case where the shooting location information is not stored in the image file, no operation is performed. The above operation is performed on all the image files with the clip setting stored in the recording medium.

In above embodiment 5, a GPS is quoted as an acquirer for location information which acquires location information; however, instead of the GPS, or with the GPS, another acquirer for location information, for example, an electric compass, a device for identifying a location per base station by receiving identification signal information transmitted from a base station of a mobile phone or the like may be used.

In the above embodiment, the image file with the bookmark is preferentially displayed when starting up in the playback mode. However, the image file with the bookmark may be displayed also in a case where a latest image is displayed firstly when starting up in the playback mode and then a predetermined operation button is pressed. Even in this case, it is not necessary to send forward and backward image files to search a target image file, and the target image file is displayed by an easy operation.

[Embodiment 6]

Figure 37:
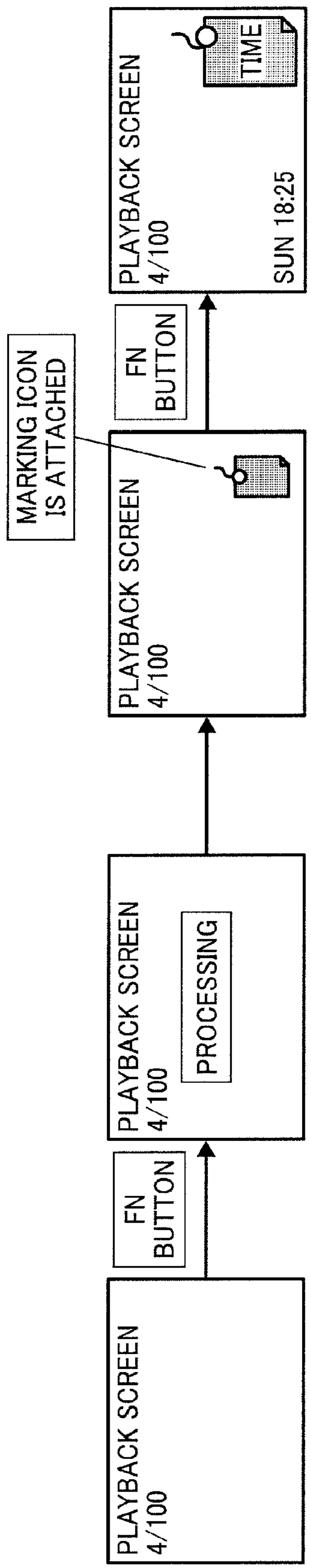
FIG. 37 is a flow chart illustrating a movement of a clip function in the playback mode in embodiment 6.

A characteristic of embodiment 6 is to display a current time on a marked picture image, that is, to display a current time on an image file with a bookmark or with a clip. FIG. 37 illustrates an operation flow of an imaging apparatus or a stored picture image playback method according to embodiment 6. Firstly, selecting an image file to which a user wishes to attach a timetable or the like bookmark which displays the current time, and a picture image of the image file is displayed on the LCD. An example of FIG. 37 illustrates that the bookmark is attached to 4/100, that is, a 4th image file of 100 image files. In this state, by pressing the function button Fn, bookmark information is attached to the 4/100 image file and an icon of the bookmark is displayed on the LCD. A second playback screen image from the left is a processing picture image, and after processing, as illustrated in a third playback screen image from the left, an icon indicating that a bookmark is attached to a picture image of the 4/100 image file is displayed. And by pressing the function button Fn again, a "timetable marking (bookmark)" is set to this image file.

Figure 38:
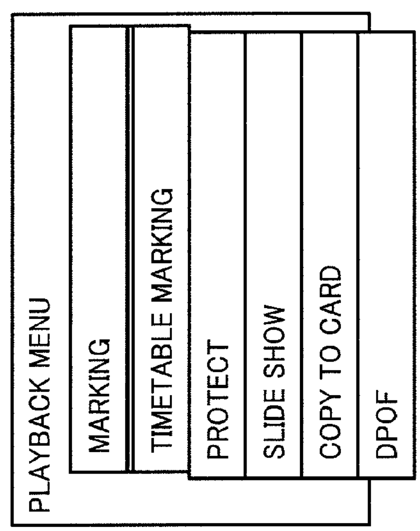
FIG. 38 is a diagram illustrating an example of a management information file of an image file with a clip which is applicable to the above embodiment.
Figure 39:
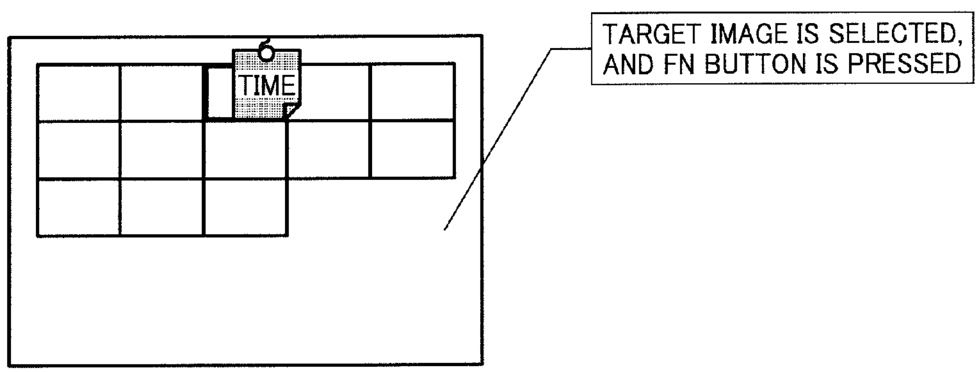
FIG. 39 is a diagram illustrating an example of an image screen used in a case of setting a bookmark to an image file in the above embodiment.

Methods of attaching a bookmark to the image file other than the above method, may be that as illustrated in FIG. 38, in a state where a playback menu screen image is displayed, a "timetable marking" in the playback menu screen image is selected, and may be that as illustrated in FIG. 39, in a state where a plurality of image files are displayed in the thumbnail format, a target image file is selected by a cursor, and the function button Fn is pressed, and then a "timetable marking" is set to this image file.

In the example of FIG. 37, the time displayed on a playback picture image is "Sun 18:25". This indicates that the time of displaying the playback picture image is on "Sunday at 18:25".

Figure 40:
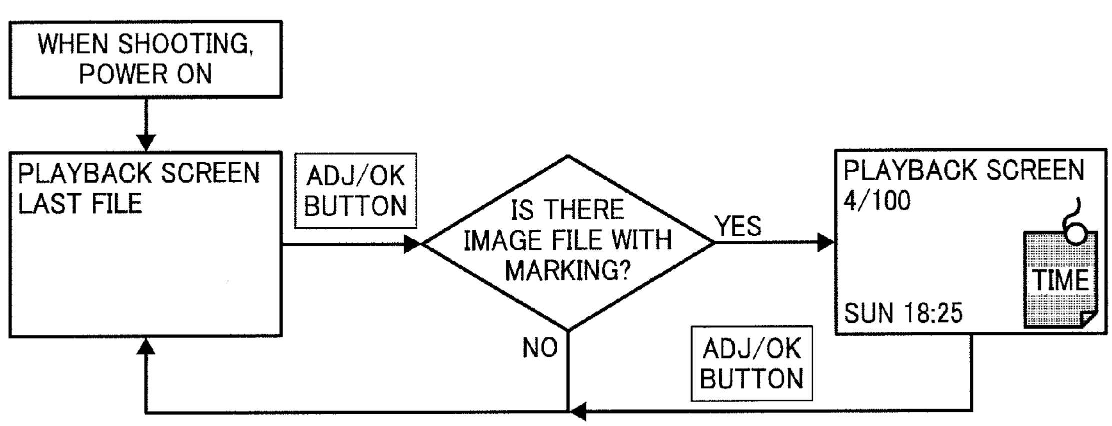
FIG. 40 is a flow chart illustrating a method of displaying an image file with a clip in the above embodiment.
Figure 41:
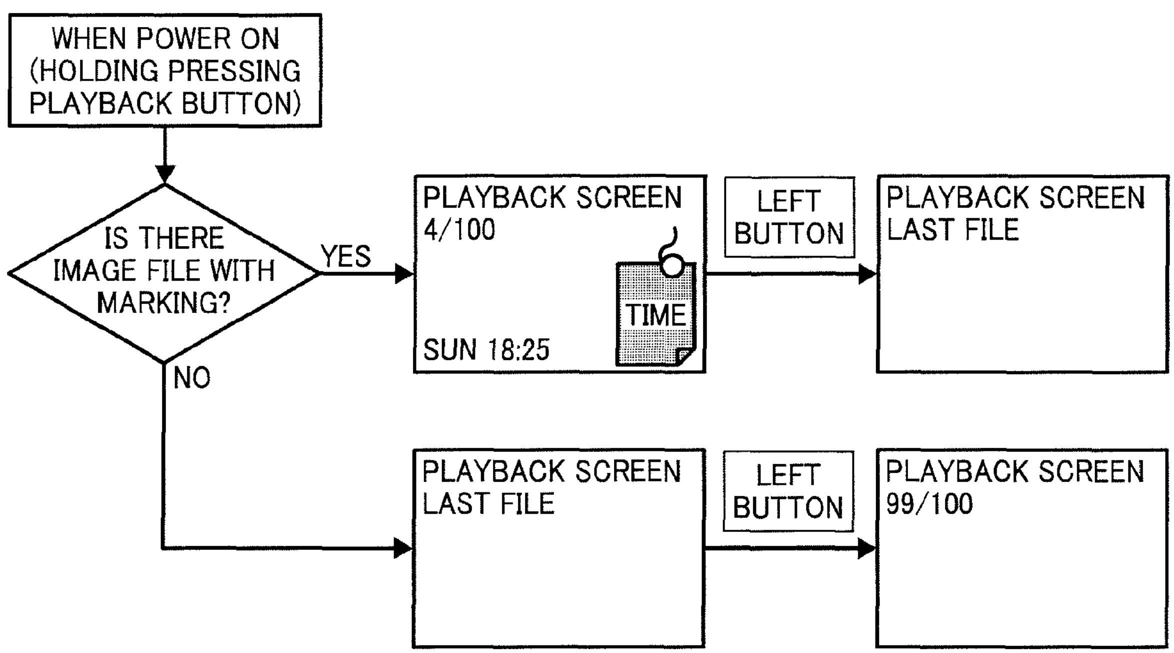
FIG. 41 is a flow chart illustrating another method of displaying an image file with a clip in the above embodiment.

FIGS. 40 and 41 illustrate examples of methods of displaying the image file with the bookmark.

FIG. 40 is a flow chart where a camera is structured to display an image file in a case where the playback button is pressed when shooting. When the playback button is pressed in the shooting mode, a picture lastly shot, that is, a LAST FILE (last image file) is displayed. And at this time if the OK button is pressed and there is the image file with the bookmark, the image file with the bookmark is displayed, and then when the OK button is pressed again, returning to the last image file and the last image file is displayed. And if there is no image file with a bookmark, the LAST FILE is displayed.

FIG. 41 illustrates a movement where a camera is started up by pressing the playback button for a predetermined time. In this example, firstly, judging if there is the image file with the bookmark or not, and if there is the file with the bookmark, the image file with the bookmark, for example, if the image file is the same as the above example, a 4/100 image file is displayed. In a case where there is no image file with a bookmark, the LAST FILE is displayed.

And in a case where the image file with the "timetable bookmark" is played back, the current time is displayed on the image file.

Figure 42:
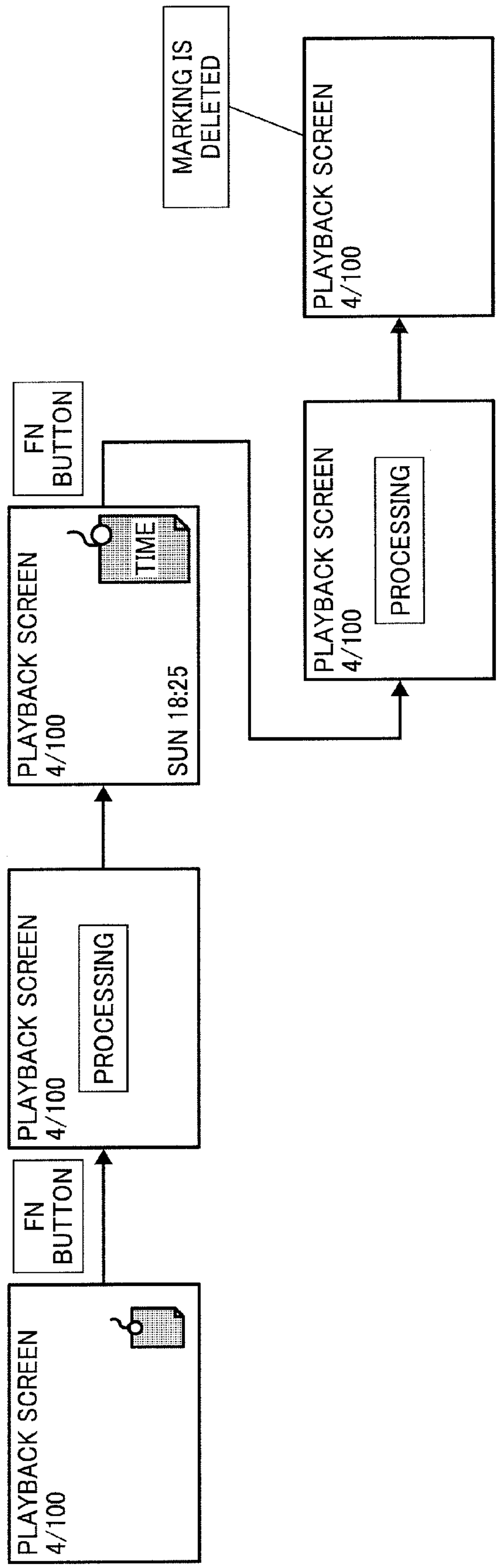
FIG. 42 is a flow chart illustrating a movement of deleting a clip of an image file with a clip in the above embodiment.
Figure 43:
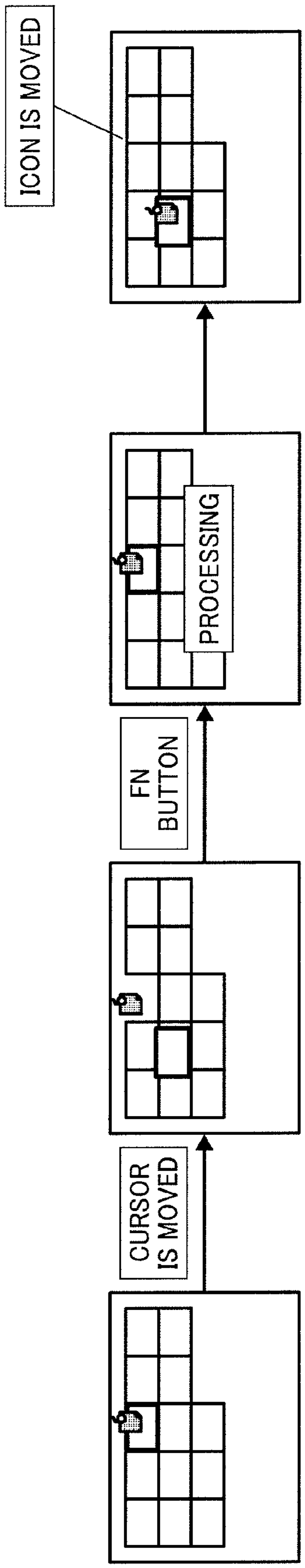
FIG. 43 is a flow chart illustrating a movement of changing a clip of an image file with a clip in the above embodiment.

FIG. 42 illustrates a method of deleting an attached timetable bookmark, and FIG. 43 illustrates a method of changing the timetable bookmark of the image file with the timetable bookmark to a different image file.

As illustrated in FIG. 42, in a state where the image file with the timetable bookmark is displayed, when the function button Fn is pressed, the timetable bookmark is deleted from the image file the timetable bookmark.

As illustrated in FIG. 43, in a case where a plurality of picture images are displayed in the thumbnail format, when a different image file is selected and a bookmark is attached, the bookmark (timetable bookmark) of the image file with the timetable bookmark is deleted and a bookmark (either an ordinary bookmark or the timetable bookmark) is attached to the different image file.

In other words, the bookmark (either an ordinary bookmark or the timetable bookmark) is attached to only one image file among a plurality of shot image files.

According to embodiment 6, a shot image, for example, a picture image of a timetable is promptly displayed with the current time. In a case where a user decides which bus, train or the like to take, searching is easily performed and completed only on the LCD. The current time is not displayed on an image file without a bookmark, therefore viewing playback images is not disturbed.

[Embodiment 7]

In embodiment 7, in a case where a camera is started up in the playback mode, when there is a selected image file from among a plurality of picture images, comparing information of the selected image file when shooting by an acceleration sensor to a difference of user's camera holding manners, that is, a difference whether the user holds a camera vertically or horizontally when playing back, and based on this comparison result, an image file to be displayed from among the selected image file is determined and displayed. The above acceleration sensor detects whether the user holds the camera vertically or horizontally by its detected output. In a case where there is no selected image file, an image file lastly shot, regardless of the user's camera holding manner when shooting, is displayed as usual.

Figure 44:
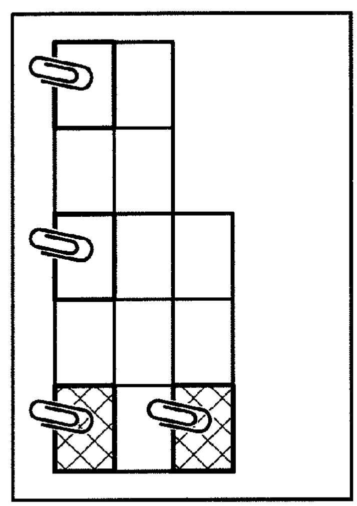
FIG. 44 is a diagram illustrating an example of an image screen used in a case of setting a bookmark to an image file in embodiment 7.

FIG. 44, in a case where there are picture images shot by holding the camera vertically and horizontally, illustrates an example of viewing these picture images in the thumbnail format. In this example, 2 picture images shot by holding the camera vertically, 2 picture images shot by holding the camera horizontally, and 9 picture images without bookmarks are displayed. Among picture images with bookmarks, to distinguish the picture images shot by holding the camera horizontally from the picture images shot by holding the camera vertically, the picture images shot by holding the camera horizontally are shaded. Numbers 1, 2, 3 . . . are numbered to the picture images displayed in the thumbnail format in turns from the top left.

Figure 45:
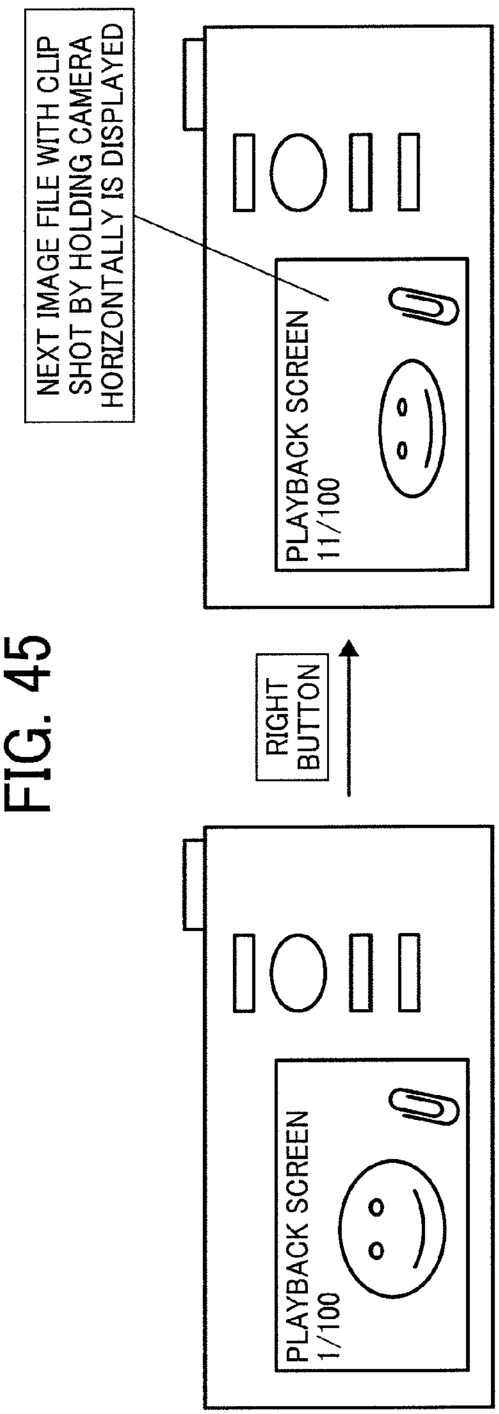
FIG. 45 is a diagram illustrating an example of displaying one of shot images shot by holding a camera horizontally and in a case where a direction of the camera when playing back is in a horizontal direction in the above embodiment.

FIG. 45 illustrates an example where a first picture image of the picture images shot by holding the camera horizontally is displayed, in a case where the user's camera holding manner when playing back is judged to be horizontally (ordinarily) from an output of the acceleration sensor. In a case of viewing a next picture image, for example, a right button is pressed. In this example, an 11th picture image (bottom left picture image) which is a next (second) picture image shot by holding the camera horizontally is displayed.

Figure 46:
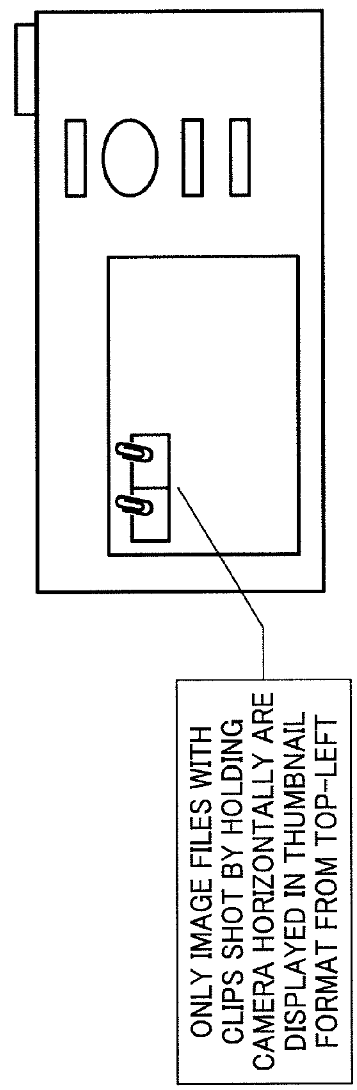
FIG. 46 is a diagram illustrating an example of displaying in a thumbnail format a plurality of shot images shot by holding a camera horizontally in a case where a direction of the camera when playing back is in a horizontal direction in the above embodiment.

FIG. 46 is a display screen image illustrating a plurality of the picture images only shot by holding the camera horizontally playing back in the thumbnail format.

FIG. 46 illustrates an example where a plurality of the image files shot by holding the camera horizontally are displayed, in a case where the user's camera holding manner when playing back is judged to be horizontally (ordinarily).

Similar to the above case, the plurality of the image files are displayed in the thumbnail format. In a state where, for example, a left picture image is selected and this picture image is displayed entirely on the display screen, and, for example, a right button is pressed, then a next picture image of the picture images shot by holding the camera horizontally is displayed.

Figure 47:
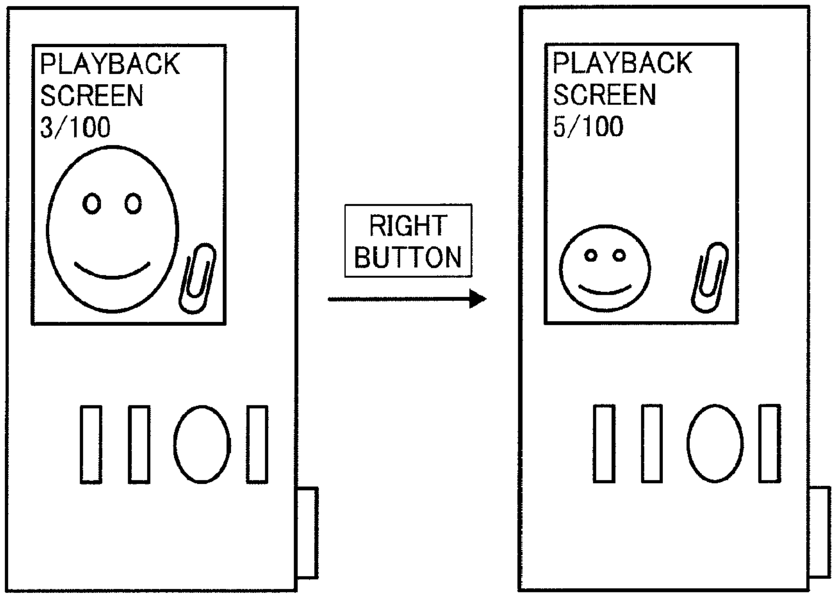
FIG. 47 is a diagram illustrating an example of displaying one of shot images shot by holding a camera vertically and in a case where a direction of the camera when playing back is in a vertical direction in the above embodiment.

FIG. 47 illustrates an example where a first picture image (a 3rd picture image from the top left in the example illustrated in FIG. 44) of the picture images shot by holding the camera vertically is displayed, in a case where the user's camera holding manner when playing back is judged to be vertically from an output of the acceleration sensor. In a case of viewing a next picture image, for example, a right button is pressed. In this example, a 5th picture image from the top left (top right picture image) illustrated in FIG. 44 which is a next (second) picture image shot by holding the camera vertically is displayed.

Figure 48:
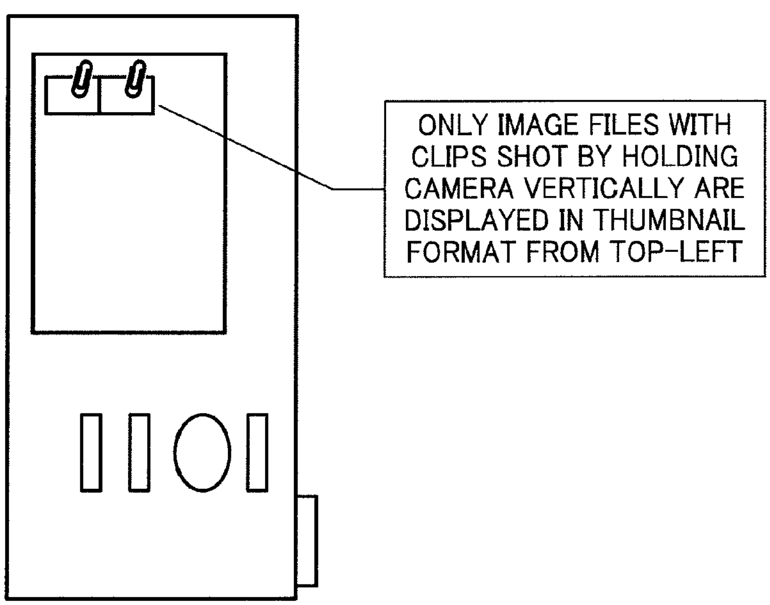
FIG. 48 is a diagram illustrating an example of displaying in a thumbnail format a plurality of shot images shot by holding a camera vertically in a case where a direction of the camera when playing back is in a vertical direction in the above embodiment.

FIG. 48 illustrates a display screen image where a plurality of the picture images shot by holding the camera vertically are displayed, that is, displayed in the thumbnail format. Usually, when playing back, in a case of viewing the picture images displayed in the thumbnail format with holding the camera horizontally, each picture image is aligned from left to right from the top left of the LCD. In the present embodiment, as illustrated in FIG. 48, even in a case of viewing the picture images displayed in the thumbnail format with holding the camera vertically, each picture image is aligned from left to right from the top left of the LCD.

[Embodiment 8]

Next, in embodiment 8 which relates to an imaging apparatus and a stored picture image playback method, a shooting condition is stored, a specific picture image of shot picture images is selected, and thereby a shooting is possible to be performed automatically based on shooting information of already stored picture image without setting an item of shooting condition by a user each time, and a shot picture image desired by the user is possible to be obtained easily.

Hereinafter, referring to FIGS. 49 to 51, embodiment 8 will be explained.

Figure 49:
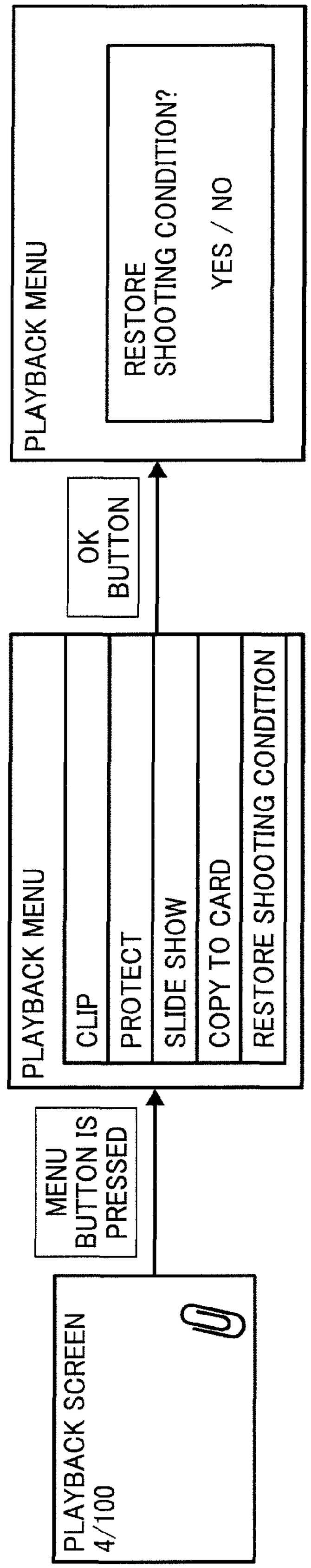
FIG. 49 is a flow chart illustrating a movement of restoring a shooting condition in embodiment 8.

FIG. 49 illustrates an operation flow, in a state where a playback screen of a specific picture image is displayed, to restore a setting of a shooting condition of the specific picture image and perform a next shooting by the setting of the shooting condition. As illustrated in FIG. 49, a favorite picture image, for example, a picture image where a bookmark is attached beforehand (a picture image with a bookmark) or the like is outputted on the playback screen. Next, a menu screen image is displayed, and an item of "restore shooting condition" of the picture image with the bookmark is selected, and then the OK button is pressed. Then, a screen image which reads the above shooting condition as a setting of the camera appears. If a shooting is performed by the above shooting condition, "yes" is selected. A movement after restoring the shooting condition works similarly to a movement in a traditional shooting mode under the restored shooting condition by restoring from the playback mode to an ordinary shooting mode.

As parameters (data) which are read as the shooting condition, for example, there are setting data of an ISO (international organization for standardization), a white balance, gamma curves used in a gamma correction, an aperture correction, a noise reduction, a distortion correction value, and in addition, setting data of a zoom position and a focus position which are lens control values, and an F-number of a lens and so on. a shooting condition which previously stored before the shooting condition of the image file with the bookmark is read is rewritten and deleted.

In this embodiment, the restored shooting condition is possible to be registered as a user's original shooting condition. In other words, a so-called my setting registration function is provided. The my setting registration function is a function that, when a dial key specifies, for example, any one of "MY1", "MY2" and "MY3", the registered shooting condition is automatically selected and restored without manually setting a frequently used setting item by a user.

Figure 50:
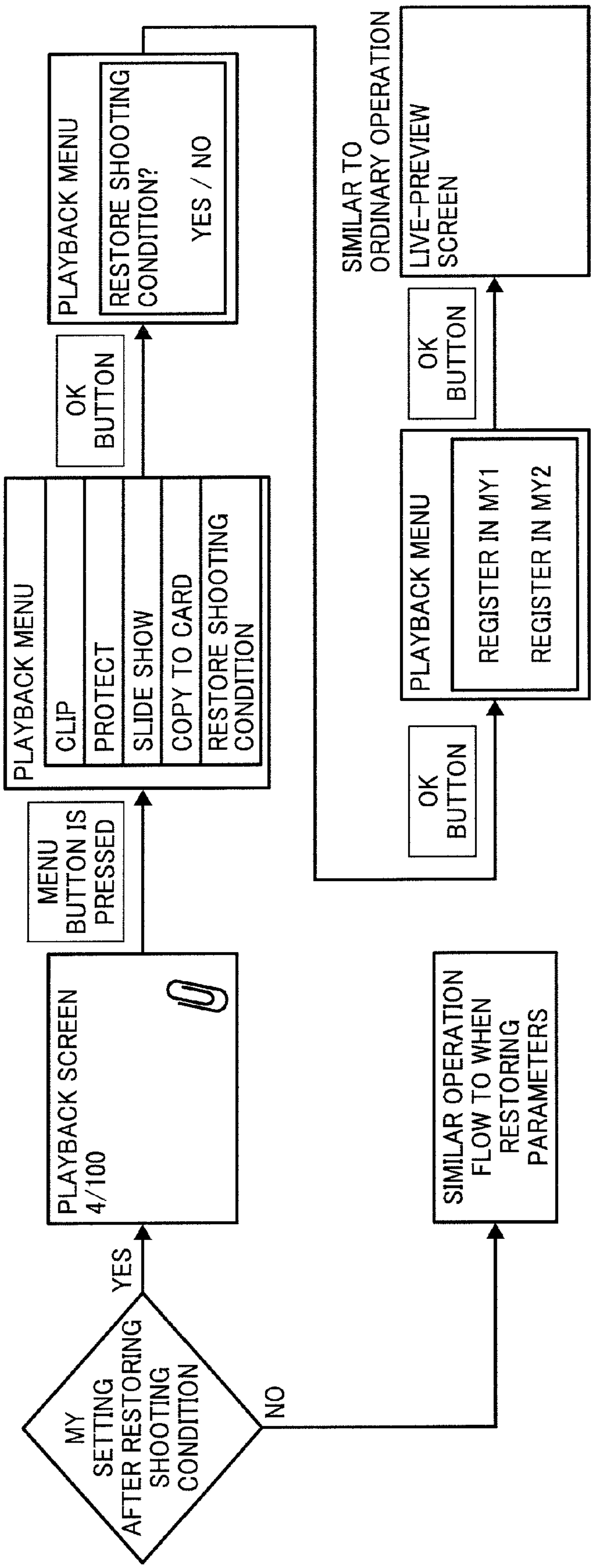
FIG. 50 is a flow chart illustrating a movement of my setting registration in the above embodiment.

FIG. 50 illustrates an operation flow of this my setting registration function.

In FIG. 50, firstly, selecting whether "my setting after restoring shooting condition" is performed or not is carried out. And in a case where "my setting after restoring shooting condition" (my setting) is selected, like the operation flow of FIG. 49, the operation flow proceeds to displaying a shot picture image with a bookmark, operating the menu button, selecting "restore shooting condition" of the playback menu screen image, operating the OK button, and displaying the playback menu screen image to confirm whether the shooting condition is restored or not. When the OK button is pressed on this playback menu screen image, a playback menu screen image for my setting registration is displayed. On the playback screen image, names of some storage areas for my setting registration are displayed. In this example, 2 storage areas, "MY1" and "MY2" in which the shooting condition is stored are provided. And when one of the storage areas is selected and the OK button is pressed, switching to the shooting mode and a live-preview screen image is displayed, and a shooting is performed on the shooting condition registered in the selected storage area described above by a similar operation to the ordinary operation.

In a case where "my setting after restoring shooting condition" is not performed, an operation flow becomes a similar operation flow to when restoring the shooting condition illustrated in FIG. 49, that is, when restoring the above parameters (data) which were set when shooting.

Figure 51:
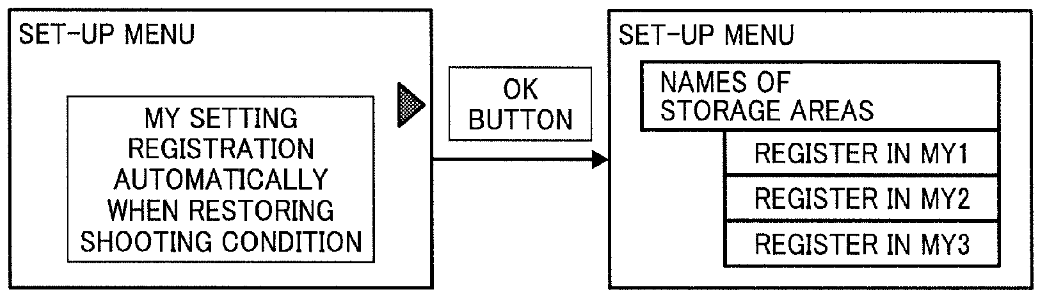
FIG. 51 is an example of directly registering the restored shooting condition as my setting registration in the above embodiment.

FIG. 51 illustrates an example of registering a recalled shooting condition on "MYn" (n is a positive integer) directly as a my setting registration, without performing a selection of the above storage areas each time. On a set-up menu screen image, when "MY setting registration automatically when restoring shooting condition" is selected and the OK button is pressed, names of the storage areas are displayed. And when an optional storage area is selected, my setting registration is completed. In the shooting mode, when the optional storage area is selected and a shooting is performed, the shooting is performed by the shooting condition registered on the storage area.

In a case where the recalled shooting condition is set, for a user who does not wish to rewrite the shooting condition which has already been registered, it is preferable to add a function of avoiding a function of rewriting in the storage area.

According to embodiment 8 of the imaging apparatus or the stored picture image playback method, a shooting condition of a selected picture image is read out from header information of the selected picture image by the selector, and a shooting condition setter which sets the same shooting condition as this shooting condition and shoots is provided. And thereby each time a user does not need to set a frequently-used shooting condition item, a shooting condition is automatically set based on shooting information of the image file which has been already stored. Accordingly, the convenience of the setting of the shooting condition is enhanced.

[Embodiment 9]

Figure 52:
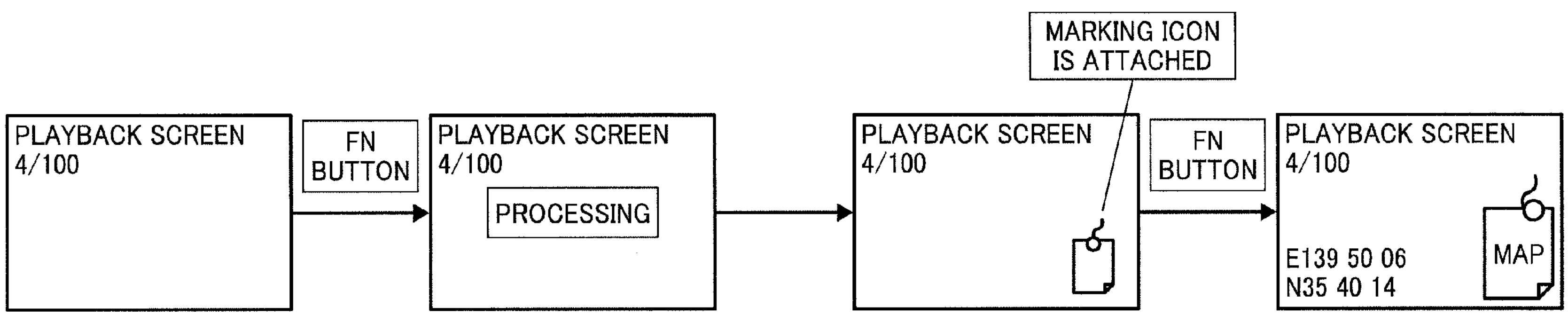
FIG. 52 is a flow chart of illustrating a movement of displaying coordinates of a current location in embodiment 9.

Embodiment 9 relating to an imaging apparatus provided with a coordinates indicator and a stored picture image playback method to have a function as a guiding tool when visiting a specific place and so on by achieving displaying coordinates of a current location of the imaging apparatus on a playback screen image of a selected image file will be explained. FIG. 52 illustrates an operation flow of a marking (bookmark, or clip) function in embodiment 9.

Figure 53:
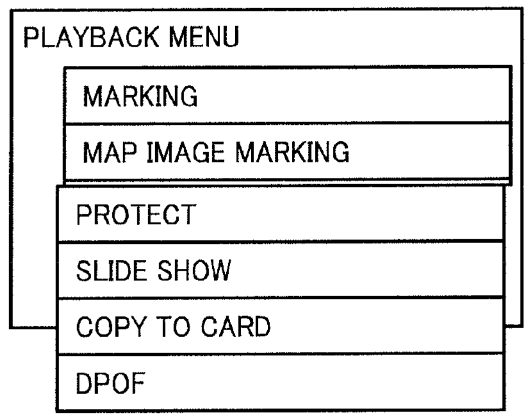
FIG. 53 is a diagram illustrating an example of displaying a playback menu in the above embodiment.
Figure 54:
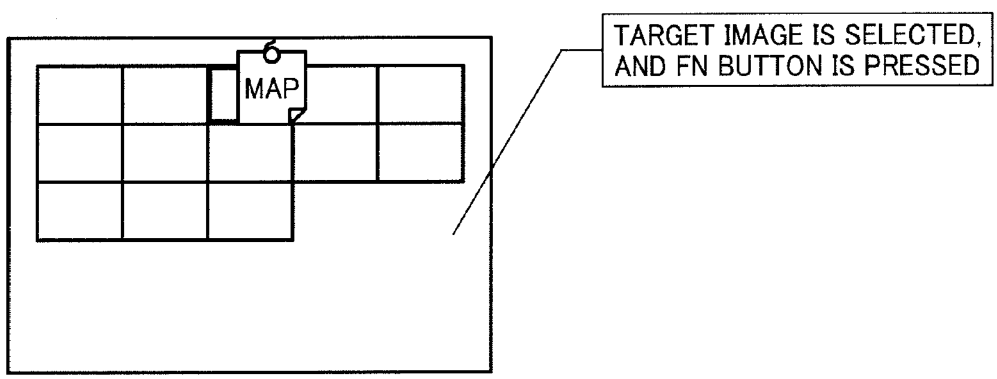
FIG. 54 is a diagram illustrating an example of an image screen used in a case of setting a marking to an image file in the above embodiment.

Firstly, an image file which a user wishes to attach a bookmark, for example, a map image or the like, is displayed on a playback screen. An example of FIG. 52 illustrates that the bookmark is attached to 4/100, that is, a 4th image file of 100 image files. In this state, by pressing the function button Fn, a bookmark (clip) icon is displayed on the display. A second playback screen image from the left is a processing picture image, and after processing, as illustrated in a third playback screen image from the left, an icon indicating that a bookmark is attached to a picture image of the 4/100 image file is displayed. And by pressing the function button Fn again, a "map image marking" is set to this image file. Methods of attaching a marking to the image file other than the above method, may be that as illustrated in FIG. 53, in a state where a playback menu screen image is displayed, a "map image marking" in the playback menu screen image is selected, and may be that as illustrated in FIG. 54, in a state where a plurality of image files are displayed in the thumbnail format, a target image file is selected by a cursor, and the function button Fn is pressed, and then a "map image marking" is set to this image file.

In the example of FIG. 52, "E139 50 06 N35 40 14" is displayed on the above picture image display. This describes that coordinates of a location where the imaging apparatus such as a camera or the like is currently located. "E139 50 06 N35 40 14" of this example describes that coordinates of the current location of the imaging apparatus when playing back are at "139°50'06" of east longitude, 35°40'14" of north latitude". Information of the current location of the imaging apparatus, that is, information of coordinates of the location where the imaging apparatus is currently located, is obtained from the GPS receiving unit 52.

Figure 55:
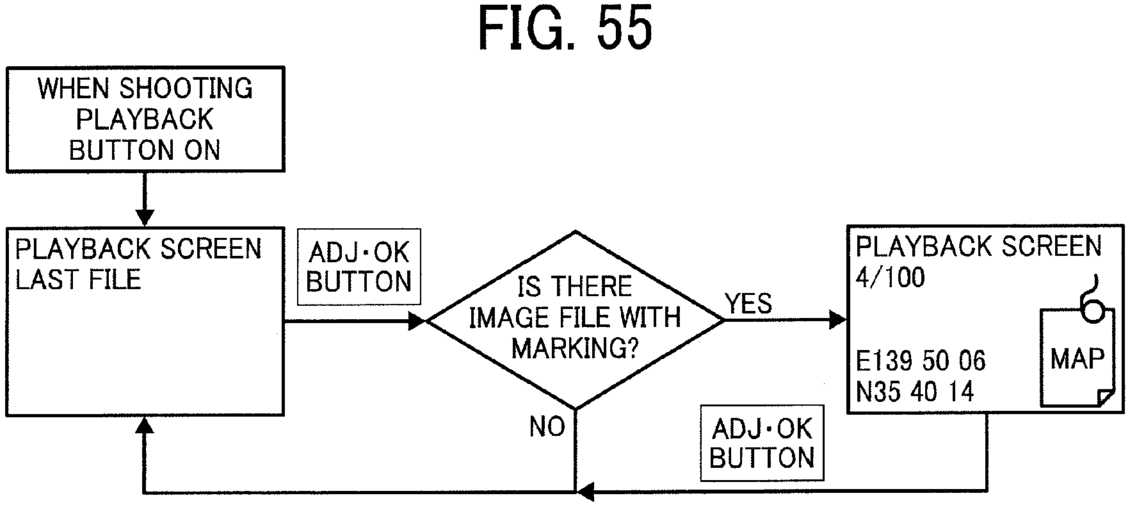
FIG. 55 is a flow chart of illustrating a movement of playing back an image file in a case where there is an image file with a marking in the above embodiment.
Figure 56:
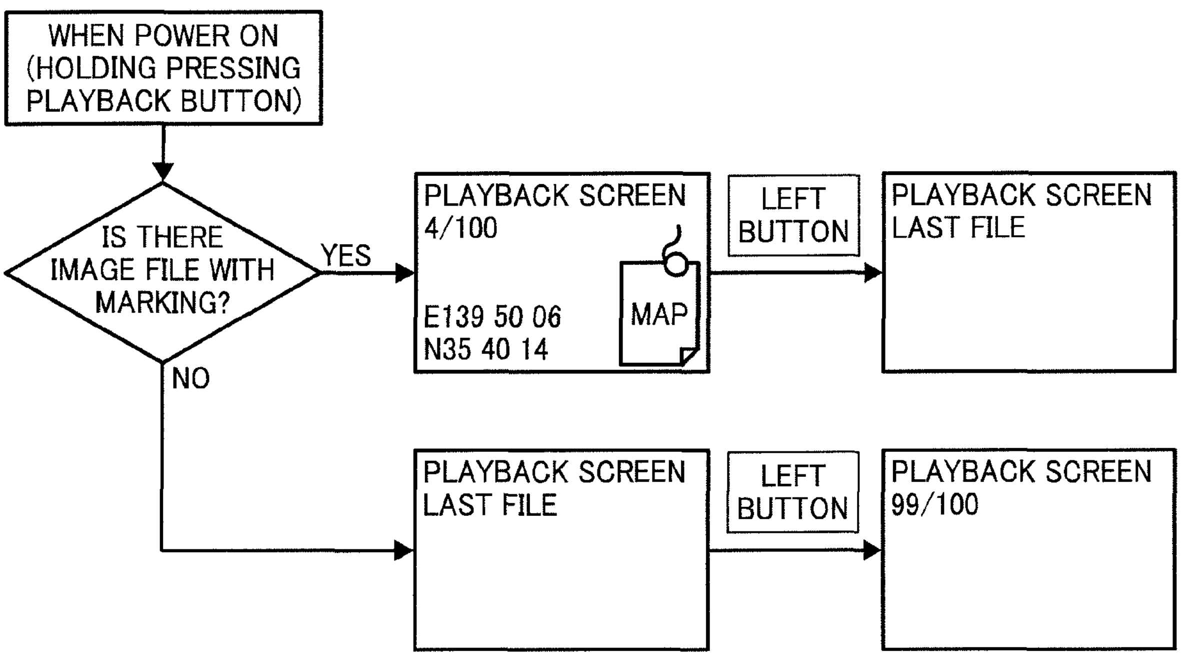
FIG. 56 is a flow chart of illustrating a movement of playing back an image file in a case where the power is turned on by the playback button in the above embodiment.

In FIGS. 55 and 56, methods of displaying an image file with a marking are illustrated.

FIG. 55 illustrates a movement in a case where the playback button is pressed when shooting. When shooting, by pressing the playback button, a picture lastly shot, that is, a LAST FILE is displayed. In this state, when the OK button is pressed, if there is an image file with a bookmark (marking), the picture image with the marking is displayed. And in a case where the OK button is pressed again, returning to the LAST FILE.

FIG. 56 illustrates a movement in a case of starting-up by pressing the playback button. In an example illustrated in FIG. 56, in a case where the power is turned on by pressing the playback button for a predetermined time and the imaging apparatus is started up, firstly, it is judged whether there is an image file with a marking or not. If there is an image file with a marking, the image file with the marking is displayed. In this illustrated example, a 4/100 image files, that is, a 4th picture image of 100 image files is displayed. If there is no image file with a marking, a LAST FILE, that is, a picture lastly shot is displayed. In a case where a map-image marking is attached to this image file, the coordinates of the current location are displayed on the playback screen image.

Therefore, for example, in a case of visiting a specific location and so on, a position to a target location is judged with reference to the picture image. The imaging apparatus according to the present embodiment is used as a practical tool, for example, a guiding tool for a destination and so on, other than basic functions that an imaging apparatus has.

Figure 57:
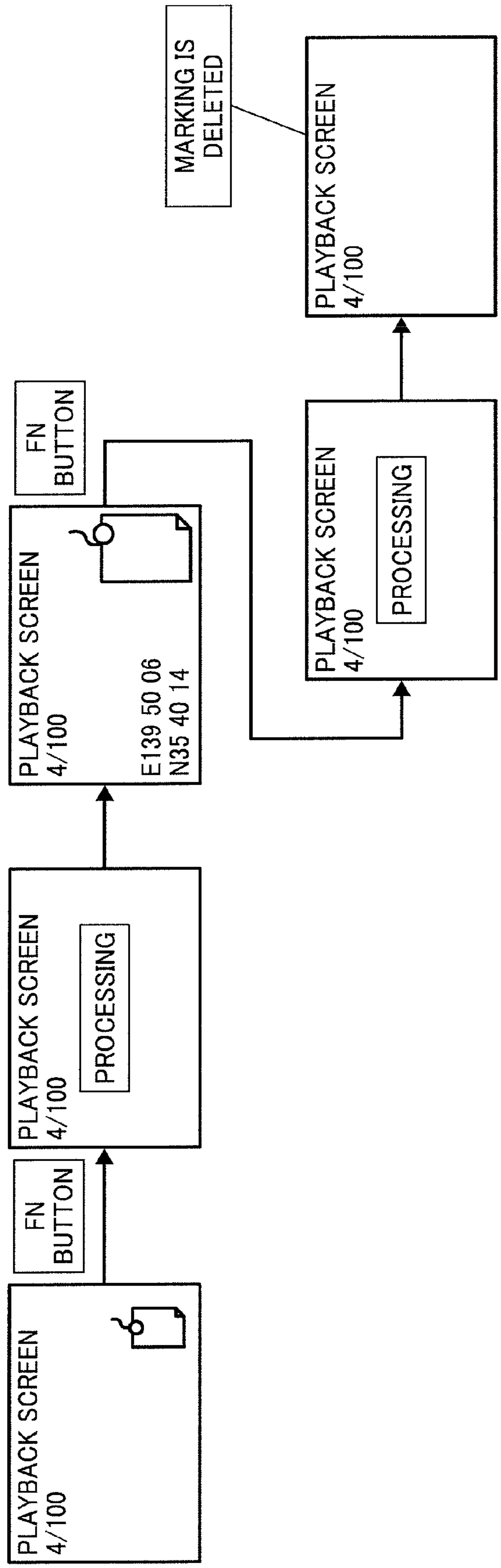
FIG. 57 is a flow chart of a movement of deleting the marking set to the image file in the above embodiment.
Figure 58:
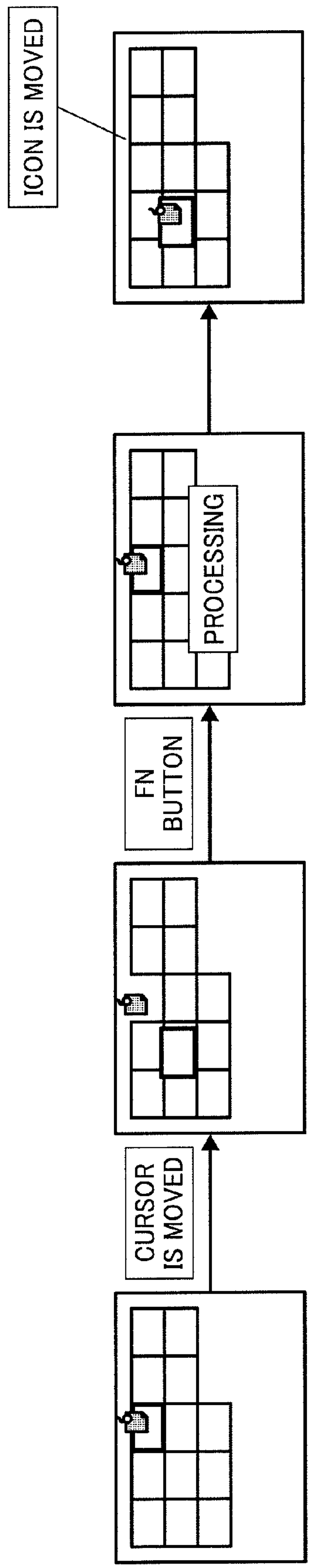
FIG. 58 is a flow chart of illustrating a movement of moving a marking of the image file with the marking to a different image file in the above embodiment.

FIG. 57 illustrates a method of deleting the map image marking from the image file with the map image marking. FIG. 58 illustrates a method of changing the map image marking of the image file with the map image marking to a different image file.

As illustrated in FIG. 57, in a state where the image file with the map image marking is displayed, when the function button Fn is pressed, the map image marking is deleted from the image file with the map image marking.

As illustrated in FIG. 58, in a case where a plurality of picture images are displayed in the thumbnail format, when a different image file is selected and a marking is attached, the marking (map image marking) of the image file with the map image marking is deleted and a marking (either an ordinary marking or the map image marking) is attached to the different image file.

In other words, the marking (either an ordinary bookmark or the map image marking) is attached to only one image file among a plurality of shot image files.

The imaging apparatus and the stored picture image playback method according to embodiment 9 are provided with a coordinates indicator which displays coordinates of the current location on a playback screen image of a selected image file and are structured such that in a case of started up in the playback mode, if there is the selected image file, the selected image file is firstly displayed. By having the above structure, for example, in a case of visiting a specific place and so on, a position to a target location is judged by referring to coordinates of a current location displayed with a picture image, and it is possible to use as a practical tool such as a guiding tool and so on other than basic functions that an imaging apparatus has.

According to the embodiments of the present invention, it is possible to provide an imaging apparatus and a stored picture image playback method such that a plurality of image files which respectively store picture images needed by a user are promptly selected from image files stored in a memory, and priorities are attached to the image files, and in a case where a selected image file is displayed on the display, each time a predetermined operation is performed on the operating section, the image files are changed and displayed in the order of priority, and thereby practicality is improved.

In addition, according to the embodiments of the present invention, it is possible to provide an imaging apparatus and a stored picture image playback method such that in a case where a picture image needed by a user is displayed, a part of the picture image is enlarged and displayed, and thereby information on the picture image which the user needs is easily read from the picture image which is enlarged and displayed.

Moreover, according to the embodiments of the present invention, it is possible to provide an imaging apparatus and a stored picture image playback method such that in a case where the imaging apparatus, for example, is a highly portable digital camera or the like, and if there is an image file related to a place to be shot, the image file is displayed on the display, and thereby a user obtains information related to the place and convenience for the user is further improved According to the embodiments of the present invention, for example, in a case of viewing a picture of a timetable, a map, or an address book which a user wishes to check frequently, a target picture image is displayed from among many image files stored in a memory by an easy operation, without sending forward and backward picture images when playing back to search the target picture image as with using a conventional digital camera and so on.

According to the embodiments of the present invention, fast readouts of image data, management information and so on are performed by storing management information of an image file in a memory or the like as a different file from the image file.

In addition, flag information indicating a selected image file is stored integrally with an image file, therefore there is no risk of separating from the image file which is possible to occur in a case of managing as a different file from the image file.

Due to determining a priority order for displaying a selected image file by, for example, a file number, image files are displayed based on the file number of the selected image files, in order of small file numbers, or large file numbers, by only performing a predetermined operation on the operating section, therefore convenience for users is improved.

A priority order of the selected image file may be determined by a registration order registered by a recorder for management information, and the selected image file is displayed based on the registration order registered by the recorder for management information by only performing a predetermined operation on the operating section, therefore convenience for users is improved.

Likewise, convenience for users is improved by determining the priority order for displaying the selected image file based on its creation time and date information.

Due to being structured to record information which indicates the priority order of the selected image file as management information of the selected image file, a fast readout of information of image data or the like and so on are performed.

Fast information managements such as a readout, an editing, a change and so on of information of image data or the like are performed by recording management information as a different file from the image file.

Due to recording management information integrally with an image file, there is no risk of separating or estranging from the image file which has a possibility of occurrence in case of managing the management information as a different file from the image file.

Due to being provided with an acquirer for shooting location information which acquires location information where a user tries to shoot, in a case where a user is in the same area as the shooting location information where the device acquires, a specific image file regarding the area is automatically and preferentially displayed, therefore each time an area where the user is changed, there is no need for performing a setting of a preferential image file, and thereby convenience for users is improved.

In addition, when a setting of preferentially displaying a specific image file based on area and location information is performed, if a user moves to an area where this information is not needed, the above setting is automatically removed, therefore there is no need for removing the above priority setting each time by the user, and the user saves the trouble, and thereby convenience for users is improved.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, which is capable of starting up in a shooting mode and in a playback mode, and capable of switching between the shooting mode and the playback mode, comprising:

a memory which stores an image file corresponding to a shot picture image;

a display which displays the picture image, and a selector which selects at least one image file from a plurality of image files stored in the memory, wherein the memory is configured to store information on the selected image file as a bookmark information, and in a case of starting up in the playback mode, it is confirmed whether the bookmark information is stored in the memory, when it is confirmed that the bookmark information is stored in the memory, the selected image file is automatically displayed on the display, and when it is confirmed that the bookmark information is not stored in the memory, a latest image file which is lastly shot and stored in the memory is displayed on the display.

2. The imaging apparatus according to claim 1, further comprising:

an operating section, wherein after switching from the shooting mode to the playback mode, the latest image file is displayed on the display, and when the operation section is operated and when there is the selected image file, the selected image file is displayed on the display.

3. The imaging apparatus according to claim 1, wherein information to judge which image file stored in the memory is the selected image file is stored in at least one of an external memory, an internal memory of the imaging apparatus, or the image file itself.

4. The imaging apparatus according to claim 3, wherein the information is stored in the external memory as a management file which is different from the image file, and the management file is read when power is turned on.

5. The imaging apparatus according to claim 1, wherein the selector selects a plurality of image files from the plurality of image files stored in the memory, and in a case of starting up in the playback mode, when there are image files selected by the selector, one of the selected image files is displayed on the display, and when there are no selected image files, the latest image file is displayed on the display.

6. The imaging apparatus according to claim 1, wherein when the selected image file is displayed on the display and enlarged by a user's instruction, a magnification and center coordinates of the displayed enlarged image are stored in a memory, and in a case where the stored image file is displayed on the display again, the image file is displayed in a state being enlarged with the stored magnification and the center coordinates.

7. The imaging apparatus according to claim 5, wherein in a case of starting up in the playback mode, when there are the selected image files, an image file with the highest priority among the selected image files is firstly displayed on the display, and then each time a predetermined operation is performed on an operating section, the image file among the selected image files is displayed on the display according to priority.

8. The imaging apparatus according to claim 7, wherein after switching from the shooting mode to the playback mode, the latest image file is displayed on the display, and in a case where a predetermined operation is performed on an operating section, when there are the selected image files, the image file with the highest priority among the selected image files is firstly displayed on the display, and then each time the predetermined operation is performed on the operating section, the image file among the selected image files is displayed one by one according to priority.

9. The imaging apparatus according to claim 7, wherein the priority is based on a selected order of the image files being selected by the selector.

10. The imaging apparatus according to claim 7, wherein the priority is based on information of time and date when the selected image files are shot and generated.

11. A stored picture image playback method, comprising:

a step of preparing an imaging apparatus, which is capable of starting up in a shooting mode and in a playback mode, and capable of switching the shooting mode and the playback mode, having: a memory which stores an image file corresponding to a shot picture image, a display which displays the picture image, a selector which selects at least one image file from a plurality of image files stored in the memory, and wherein the memory is configured to store information on the selected image file as a bookmark information, and when starting up in playback mode, a step of confirming whether the bookmark information is stored in the memory, when it is confirmed that the bookmark information is stored in the memory, a step of automatically displaying the selected image file on the display, and when it is confirmed that the bookmark information is not stored in the memory, a step of displaying a latest image file which is lastly shot and stored in the memory on the display.

12. The stored picture image playback method according to claim 11, further comprising:

a step of preparing an operating section, and a step of displaying the latest image file on the display after switching from the shooting mode to the playback mode and displaying the selected image file on the display when there is the selected image file.

13. The stored picture image playback method according to claim 11, wherein information to judge which image file stored in the memory is the selected image file is stored in at least one of an external memory, an internal memory of the imaging apparatus, or the image file itself.

14. The stored picture image playback method according to claim 13, wherein the information is stored in the external memory as a management file which is different from the image file, and the management file is read when power is turned on.

15. The stored picture image playback method according to claim 11, wherein the selector selects a plurality of image files from the plurality of image files stored in the memory, and in a case of starting up in the playback mode, when there are image files selected by the selector, one of the selected image files is displayed on the display, and when there are no selected image files, the latest image file is displayed on the display.

16. The stored picture image playback method according to claim 11, wherein when the selected image file is displayed on the display and enlarged by a user's instruction, a magnification and center coordinates of the displayed enlarged image are stored in a memory, and in a case where the stored image file is displayed on the display again, the image file is displayed in a state being enlarged with the stored magnification and the center coordinates.

17. The stored picture image playback method according to claim 15, wherein in a case of starting up in the playback mode, when there are the selected image files, an image file with the highest priority among the selected image files is firstly displayed on the display, and then each time a predetermined operation is performed on an operating section, the image file among the selected image files is displayed on the display according to priority.

18. The stored picture image playback method according to claim 17, wherein after switching from the shooting mode to the playback mode, the latest image file is displayed on the display, and in a case where a predetermined operation is performed on an operating section, when there are the selected image files, the image file with the highest priority among the selected image files is firstly displayed on the display, and then each time the predetermined operation is performed on the operating section, the image file among the selected image files is displayed one by one according to priority.

19. The stored picture image playback method according to claim 17, wherein the priority is based on a selected order of the image files being selected by the selector.

20. The stored picture image playback method according to claim 17, wherein the priority is based on information of time and date when the selected image files are shot and generated.

* * * * *